(12) United States Patent
Piasecki et al.

(10) Patent No.: US 11,661,186 B2
(45) Date of Patent: May 30, 2023

(54) SYSTEM AND METHOD FOR UNMANNED AERIAL SIGNAL RELAY

(71) Applicant: Dragonfly Pictures, Inc., Essington, PA (US)

(72) Inventors: Michael W. Piasecki, Haverford, PA (US); Joseph S. Pawelczyk, Jr., Philadelphia, PA (US); Jeffrey Field, Springfield, PA (US)

(73) Assignee: Dragonfly Pictures, Inc., Essington, PA (US)

( * ) Notice: Subject to any disclaimer, the term of this patent is extended or adjusted under 35 U.S.C. 154(b) by 923 days.

(21) Appl. No.: 16/436,307

(22) Filed: Jun. 10, 2019

(65) Prior Publication Data

US 2020/0385115 A1 Dec. 10, 2020

(51) Int. Cl.
 *B64C 39/02* (2023.01)
 *H04B 10/2575* (2013.01)
(52) U.S. Cl.
 CPC .......... *B64C 39/022* (2013.01); *B64C 39/024* (2013.01); *H04B 10/2575* (2013.01); *B64C 2201/122* (2013.01); *B64C 2201/205* (2013.01)
(58) Field of Classification Search
 CPC ............... B64C 39/022; B64C 39/024; B64C 2201/122; B64C 2201/205; H04B 10/2575
 See application file for complete search history.

(56) References Cited

U.S. PATENT DOCUMENTS

| | | |
|---|---|---|
| 2,995,740 A | 8/1961 | Shreckengost |
| 3,381,922 A | 5/1968 | Laing |
| 6,397,063 B1 | 5/2002 | Sessions |
| 7,149,611 B2 | 12/2006 | Beck |
| 7,152,547 B1 * | 12/2006 | Hovland ................ B63B 17/00 114/261 |
| 7,510,142 B2 | 3/2009 | Johnson |
| 8,386,095 B2 | 2/2013 | Fitzpatrick |
| 8,931,732 B2 | 1/2015 | Sirohi |

(Continued)

OTHER PUBLICATIONS

Aerostat Communications Relay from Unmanned Surface Vehicle (https://navystp.com/vtm/print?project=N00024-15-C-4010, retrieved Jun. 1, 2022), (2p., May 2016).

(Continued)

*Primary Examiner* — Geepy Pe
*Assistant Examiner* — Paulo Roberto Gonzalez Leite
(74) *Attorney, Agent, or Firm* — Riverside Law LLP

(57) ABSTRACT

An unmanned aerial signal relay includes an unmanned aerial vehicle, including a communication relay unit and at least one antenna, communicatively connected to the communication relay unit; a tether comprising at least two wires and at least one fiber optic cable, the wires and cable communicatively connected to the unmanned aerial vehicle; and a surface support system comprising a spool physically connected to the tether and a ground-based receiver communicatively connected to the at least one fiber optic cable, wherein the unmanned aerial vehicle is powered by electrical energy provided by the at least two wires, and wherein the communication relay unit is configured to relay signals received from the at least one antenna via the fiber optic cable to the ground-based receiver. Various systems and methods related to an unmanned aerial signal relay are also described.

11 Claims, 18 Drawing Sheets

(56) References Cited

U.S. PATENT DOCUMENTS

| | | | |
|---|---|---|---|
| 8,948,928 B2 | 2/2015 | Alber | |
| 8,982,333 B2 | 3/2015 | Guetta | |
| 9,056,687 B2 | 6/2015 | Shachor | |
| 2002/0190162 A1* | 12/2002 | McDonnell | B64D 47/08 |
| | | | 244/170 |
| 2013/0233964 A1* | 9/2013 | Woodworth | B64C 25/58 |
| | | | 244/175 |
| 2014/0183300 A1* | 7/2014 | MacCulloch | B64C 39/024 |
| | | | 244/1 TD |
| 2018/0273171 A1* | 9/2018 | Riedel | B64C 29/02 |
| 2018/0319495 A1* | 11/2018 | Tu | G05D 1/0011 |
| 2019/0218076 A1* | 7/2019 | Fulk, II | B66D 1/28 |
| 2019/0283869 A1* | 9/2019 | Broberg | B64F 3/02 |
| 2020/0058228 A1 | 2/2020 | Talke | |
| 2020/0201316 A1* | 6/2020 | Schupke | G05D 1/106 |

OTHER PUBLICATIONS

K. A. Talke, M. De Oliveira and T. Bewley, "Catenary Tether Shape Analysis for a UAV-USV Team," 2018 IEEE/RSJ International Conference on Intelligent Robots and Systems (IROS), 2018, pp. 7803-7809, doi: 10.1109/IROS.2018.8594280.

Navy SBIR/STTR Success—Unmanned Multi-Rotor Aerial Relay (UMAR) (https://www.navysbir.com/success/Dragonfly-Pic.pdf, retrieved Jun. 1, 2022) (1 p., 2018).

Unmanned Maritime Systems (https://www.navygoldcoast.org/wp-content/uploads/2016/2016Presentations/Tuesday Breakout/2016 GC UUV-USV Panel Presentation - CAPT Honabach.pdf, retrieved Jun. 1, 2022) (11p., 2016).

\* cited by examiner

SYSTEM AND METHOD FOR UNMANNED AERIAL SIGNAL RELAY

STATEMENT REGARDING FEDERALLY SPONSORED RESEARCH OR DEVELOPMENT

This invention was made with government support US Department of Navy SBIR contract N00024-13-P-4589 and contract N00024-15-C-4010. The government has certain rights in the invention.

BACKGROUND OF THE INVENTION

Modern seafaring vessels are limited in their ability to communicate from ship to ship or ship to land in a secure manner. Although satellites are able to drastically expand the communication range in most places on earth, satellites can be costly, may only offer communication during fixed time windows depending on their orbits, and may be impeded by weather events. Conventional radio communication is limited by ship size and the curvature of the Earth—it is impractical to mount a communication antenna too much taller than the deck of a ship. The lower the antenna is positioned, the closer its horizon for point-to-point radio communication. Thus, fixed ship-board antennas have an extremely limited communication range.

Some ships solve this problem by mounting a signal relay on a balloon or other flying object, but such systems have numerous disadvantages, including difficulty of controlling the trajectory, position, and directionality of the signal relay, and the security of communications between the relay and the ship. In high winds, or when a ship is in motion, the added drag on a balloon could prevent it from reaching the required altitude. A communication relayed through a floating signal relay will necessarily be broadcast twice, doubling the chance that it is intercepted by a nearby adversary.

Existing systems face other challenges. Any powered vehicle used as a relay must necessarily either lift a heavy battery or be powered through a physical tether, whose weight increases with the vehicle's height. Tethers can become entangled in the mast structure of a vessel, which can lead to damage to the tether, the vehicle, or the vessel itself. Some existing systems use on-board barometers as an altitude estimate, but over the course of a flight, the barometric pressure can change dramatically, leading to inaccurate altitude readings.

Existing tethered, powered aircraft are difficult to control, because of forces and moments imparted onto the vehicle by the tether. Existing GPS-assisted landing systems are unsuitable for the moving deck of a ship, where GPS may not be available, or not be sufficiently accurate. Maneuvering a tethered, powered aircraft is further complicated by the un-aerodynamic nature of multi-rotor aircraft. With rotors fixed to the airframe, forward, backward, and lateral movement may only be accomplished by rolling or pitching the aircraft. Such maneuvers increase cross sectional area and, consequently, drag.

Certain components of powered aircraft require active cooling, for example with fans blowing air past one or more heat sinks to dissipate heat. Such fans add unnecessarily to weight, are not waterproof, and consume power themselves. Existing tethered aircraft may also sometimes require the tether to be cut, or may alternatively suffer a failure in the tether that results in breakage and separation of the aircraft from its base. Over land, recovery may be simple, but over water a loose aircraft may sink.

Existing tethers and tether management systems for unmanned aircraft have a host of disadvantages, either generally or specifically when attached to a ship. Many paper and wire reeling operations use a "dancer" to keep a certain amount of tension on the line. The tension is generated by the weight of the dancer being pulled down by gravity. Where the tether is fixed to a ship that may itself pitch significantly in rough seas, gravity may not always be relied upon, and therefore tension in the line may be lost. A horizontally-mounted tether may jump off its pulleys. For long tethers that dissipate significant heat, a tether may melt its casing or damage winding components. In rough seas, salt water splashing into the tether management system can cause damage to control components, and a tether management system that is fixed with respect to the ship can cause stability problems.

Building a communication relay in the weight- and power-limited environment of an unmanned aircraft is also problematic. Multiple radios needlessly increase weight, and antennas can be difficult or impossible to position appropriately for effective wireless communication.

Thus, there is a need in the art for a secure, unmanned aerial signal relay in order to provide for cost-effective, long range nautical communication among parties that are widely distributed geographically. The present invention overcomes the various disadvantages of existing systems and satisfies that need.

SUMMARY OF THE INVENTION

In one aspect, an unmanned aerial signal relay comprises an unmanned aerial vehicle including a communication relay unit and at least one antenna, communicatively connected to the communication relay unit, a tether comprising at least two wires and at least one fiber optic cable, the wires and cable communicatively connected to the unmanned aerial vehicle and a surface support system comprising a spool physically connected to the tether and a ground-based receiver communicatively connected to the at least one fiber optic cable, wherein the unmanned aerial vehicle is powered by electrical energy provided by the at least two wires, and wherein the communication relay unit is configured to relay signals received from the at least one antenna via the fiber optic cable to the ground-based receiver. In one embodiment, the surface support system further comprises a ground-based transmitter communicatively connected to a second fiber optic cable, and the communication relay unit is configured to relay signals received from the ground based transmitter to the at least one antenna. In one embodiment, the system further comprises a plurality of RF-over-fiber transceivers, configured to convert optical signals received from the first fiber optic cable into radio frequency signals for the ground-based receiver, and to convert radio frequency signals from the ground-based transmitter into optical signals for the second fiber optic cable.

In one embodiment, the tether comprises two wires and two fiber optic cables. In one embodiment, the at least one antenna is a directional antenna. In one embodiment, the unmanned aerial vehicle is configured to maintain an antenna orientation over time by changing its attitude or altitude. In one embodiment, the surface support system further comprises a tether cutter configured to cut the tether if the unmanned aerial vehicle is unrecoverable. In one embodiment, the surface support system comprises a fairlead, and the fairlead is configured to allow a minimum bend radius in the tether. In one embodiment, the surface support system comprises a sheath fluidly connected to a tether inlet and surrounding a first tether pulley, the sheath having a snorkel outlet configured to drain water from the sheath away from the surface support system. In one embodiment, the tether further comprises a slip ring connected to the at least two wires, and having a cavity within, and a fiber optic rotary joint connected to the at least one optical fiber, the fiber optic rotary joint positioned within the cavity inside the slip ring, wherein the slip ring and the fiber optic rotary joint are configured to allow one end of the tether to twist about a primary axis of the tether, while not imparting any twisting force on another end of the tether.

In one embodiment, the system further comprises a plurality of linear actuators connected on one end to the landing deck of a surface support system and on the other end to a vehicle, the plurality of linear actuators configured to maintain the attitude of the landing deck when the vehicle moves. In one embodiment, the system further comprises a scissor lift connected on one end to the surface support system and on the other end to a vehicle.

In another aspect, a tether-based power system for an unmanned aerial vehicle comprises a tether having a length greater than 50 feet, comprising first and second electrically conductive wires for supplying high voltage DC power, and at least one fiber-optic cable for supplying data, and a power conversion system comprising at least one DC-DC converter, the at least one DC-DC converter configured to convert the high voltage DC power to a lower voltage DC power to the unmanned aerial vehicle, wherein the first electrically conductive wire provides a ground connection, and wherein the second electrically conductive wire provides a DC voltage in excess of 500V.

In another aspect, an antenna array for a tethered unmanned aerial vehicle comprises a gimbal fixedly attached to the unmanned aerial vehicle, and at least one antenna fixedly attached to the gimbal. In one embodiment, the at least one antenna is centered on the gimbal. In one embodiment, the at least one antenna is positioned along the circumference of the gimbal. In one embodiment, the antenna array further comprises a tether fixedly attached to the gimbal, the tether comprising the antenna. In one embodiment, the antenna is a long-wave antenna.

In another aspect, a tether management system comprises a tether moving primarily in a first direction, wound around a pulley, physically connected on a proximal end to a spool, and a tensioning mechanism connected to the pulley and the enclosure, the tensioning mechanism comprising at least one spring exerting a force on the pulley in a direction perpendicular to the first direction. In one embodiment, the tensioning mechanism is a user-controlled variable tensioning mechanism. In one embodiment, the tensioning mechanism is a fixed tensioning mechanism. In one embodiment, the system further comprises a rack parallel to the spring, oriented substantially horizontally along a track, a pinion motor having a gear whose teeth mesh with those of the rack, and a stopper fixedly connected to the rack, wherein the pinion motor is configured to move the rack, adjusting the position of the spring and in turn the position of the pulley, and the tension in the tether.

In another aspect, a system for controlling the winding of a tether comprises a spool being rotated at a winding velocity, a tether, physically connected on a proximal end to the spool, a winding pulley about which the tether is wound, and having an axle, two lead screws fixedly connected to the axle, positioned parallel to the length of the spool, and a mechanism configured to drive the two lead screws at a velocity substantially proportional to the winding velocity, to wind the tether about the spool as the spool rotates. In one embodiment, the system further comprising a constant force spring configured to pull the winding pulley along an axis substantially parallel to the length of the spool.

In another aspect, a method of calculating the position of a tethered, unmanned aerial vehicle comprises the steps of measuring a gimbal orientation from a gimbal positioned substantially centrally to an unmanned aerial vehicle airframe, the gimbal physically attached to the unmanned aerial vehicle and a tether connected to a ground unit, measuring an aircraft attitude from an aircraft attitude sensor, measuring an aircraft altitude from an altitude sensor or a pressure sensor, acquiring a ground unit position from a position sensor on the ground unit, calculating an approximate tether vector from the attitude, altitude, and gimbal orientation, and calculating the approximate position of the tethered unmanned aerial vehicle to the ground unit by adding the approximate tether vector to the ground unit position.

In one embodiment, the method further comprises measuring the aircraft attitude from an attitude sensor and calculating the approximate tether vector further based on the attitude. In one embodiment, the attitude sensor is an inertial navigation unit. In one embodiment, the method further comprises obtaining a first barometric pressure measurement from a first barometric pressure sensor physically connected to the unmanned aerial vehicle, obtaining a second barometric pressure measurement from a second barometric pressure sensor physically connected to a ground unit positioned on the opposite end of a tether, the tether physically connected to the unmanned aerial vehicle, and calculating the altitude based on the difference between the first and second barometric pressure measurements.

In another aspect, a method of calculating the altitude of a tethered unmanned aerial vehicle comprises the steps of obtaining a first barometric pressure measurement from a first barometric pressure sensor physically connected to the unmanned aerial vehicle, obtaining a second barometric pressure measurement from a second barometric pressure sensor physically connected to a ground unit positioned on the opposite end of a tether, the tether physically connected to the unmanned aerial vehicle, and calculating an approximate altitude based on the difference between the first and second barometric pressure measurements.

In another aspect, a method of controlling flight of an unmanned aerial vehicle tethered to a ground-based vehicle, comprising the steps of periodically measuring at least one GPS parameter of the ground-based vehicle, relaying the at least one GPS parameter to the unmanned aerial vehicle, and altering a velocity of the unmanned aerial vehicle to match the at least one GPS parameter of the ground-based vehicle. In one embodiment, the at least one GPS parameter comprises GPS position. In one embodiment, the at least one GPS parameter comprises GPS velocity.

In another aspect, a fairlead for a tether comprises a first platform rotatably connected to a base, the first platform and the base comprising concentric holes configured to receive the tether, and at least one pulley rotatably connected to a support member, the support member fixedly attached to the first platform and a top plate, the top plate further comprising an opening configure to receive the tether, wherein the pulley is configured to guide the tether through the opening in the top plate into the holes in the first platform and the base. In one embodiment, the at least one pulley comprises four pulleys, the four pulleys positioned at 90 degree angles about the concentric holes. In one embodiment, the fairlead further comprises at least one curved guide element positioned on the top plate opposite the at least one pulley, configured to guide the tether into the opening in the top plate.

BRIEF DESCRIPTION OF THE DRAWINGS

The foregoing purposes and features, as well as other purposes and features, will become apparent with reference to the description and accompanying figures below, which are included to provide an understanding of the invention and constitute a part of the specification, in which like numerals represent like elements, and in which.

DETAILED DESCRIPTION

Figure 1:
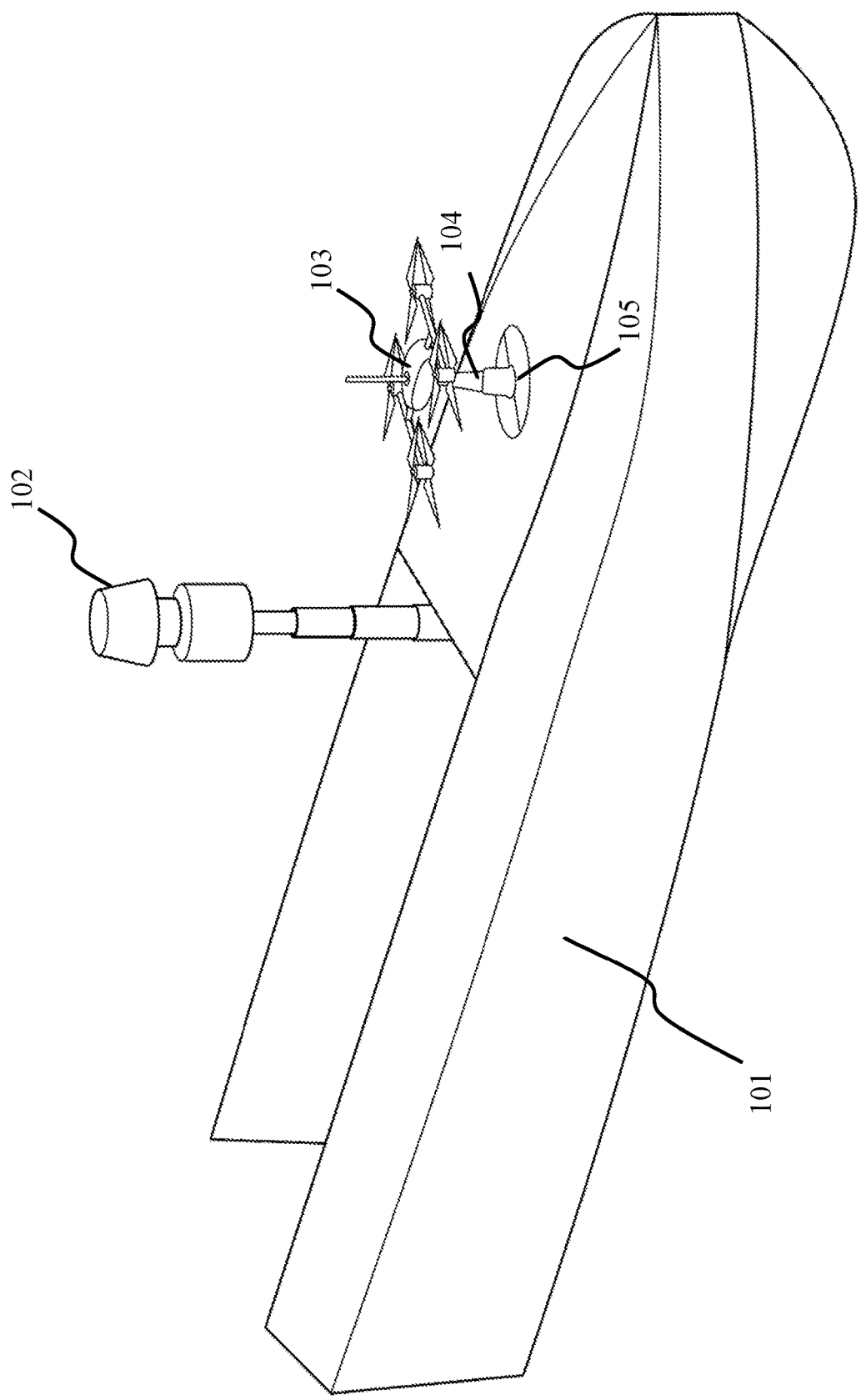
FIG. 1 is an exemplary system of the present invention.

It is to be understood that the figures and descriptions of the present invention have been simplified to illustrate elements that are relevant for a clear understanding of the present invention, while eliminating, for the purpose of clarity, many other elements found in related systems and methods. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, exemplary methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, and ±0.1% from the specified value, as such variations are appropriate.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, 6 and any whole and partial increments therebetween. This applies regardless of the breadth of the range.

In some aspects of the present invention, software executing the instructions provided herein may be stored on a non-transitory computer-readable medium, wherein the software performs some or all of the steps of the present invention when executed on a processor.

Parts of this invention are described as communicating over a variety of wireless or wired computer networks. For the purposes of this invention, the words "network", "networked", and "networking" are understood to encompass wired Ethernet, fiber optic connections, wireless connections including any of the various 802.11 standards, cellular WAN infrastructures such as 3G or 4G/LTE networks, Bluetooth®, Bluetooth® Low Energy (BLE) or Zigbee® communication links, or any other method by which one electronic device is capable of communicating with another. In some embodiments, elements of the networked portion of the invention may be implemented over a Virtual Private Network (VPN).

A system of the present invention may in some instances be referred to as an Unmanned Multirotor Aerial Relay (UMAR), having as its components an Unmanned Aerial Vehicle (UAV or Drone) and a Surface Support System (SSS). In some embodiments, the UAV component may be referred to as DP-16, a specific 8-motor UAV system. Such references are not meant to be limiting, and it is understood that systems and methods of the present invention may be used with any aerial vehicle, with any rotor configuration and any power train known in the art.

Throughout the present disclosure, the terms "ship", "boat", "seafaring vessel", "submarine", "aircraft carrier", "destroyer" or other terms may be used describing various seafaring vessels. Such terms are not meant to limit any embodiments of the invention unless explicitly stated, and it is understood that systems and methods of the present invention may be used with any suitable seafaring vessel, ship, or submarine.

With reference now to FIG. 1, an exemplary embodiment of an installed system of the present invention is shown. The exemplary system is installed in the bulkhead of seafaring vessel 101, which has communication system 102 attached to the main deck. Because the one or more antennas of communication system 102 are positioned close to the deck of the seafaring vessel 101, and thus at low altitude, the effective communication range of communication system 102 is limited. The UMAR is installed toward the fore of seafaring vessel 101, and comprises UAV 103 positioned at the end of landing arm 104, which is fixedly attached to hatch cover 105. Hatch cover 105 may in some embodiments be configured to sit in an existing hatch opening on seafaring vessel 101. In other embodiments, it may be necessary to cut a new opening in ship 101 in order to install hatch cover 105.

Figure 2:
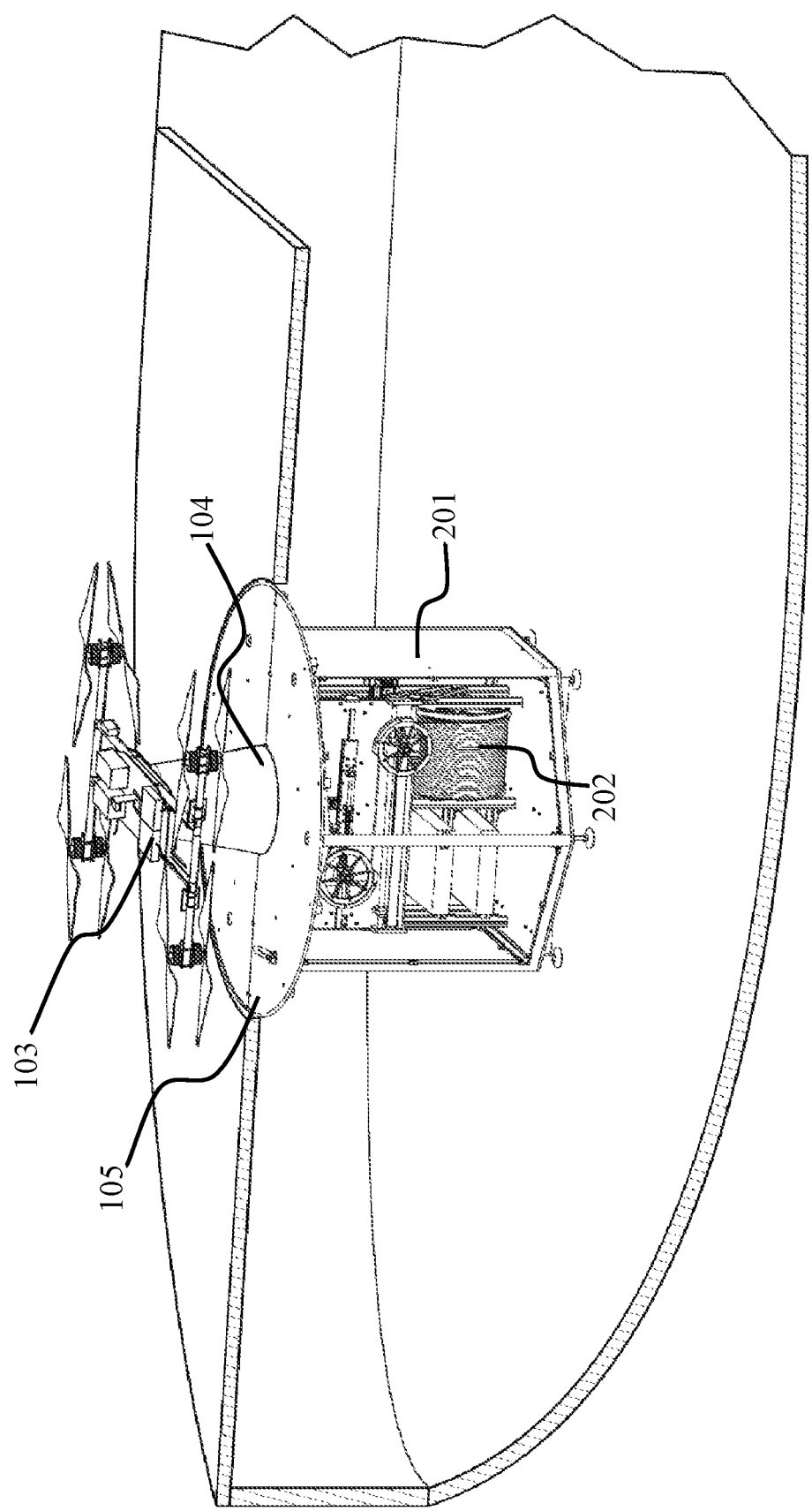
FIG. 2 is a cutaway view of an exemplary system of the present invention.

The invention may be further understood with reference to FIG. 2, which shows a cutaway view of an exemplary embodiment of an installed system of the present invention. The SSS 201 having spool 202 is shown installed below hatch cover 105. Wound around spool 202 is a tether fixedly attached to UAV 103. The various parts of SSS 201 are shown in more detail in FIG. 2. The spool 202 may advantageously be arranged so that it turns around a fore-aft axis as shown. Such positioning reduces the likelihood of tether misalignment from sudden movement, which may in some instances cause the tether to jump off one or more pulleys.

Figure 3:
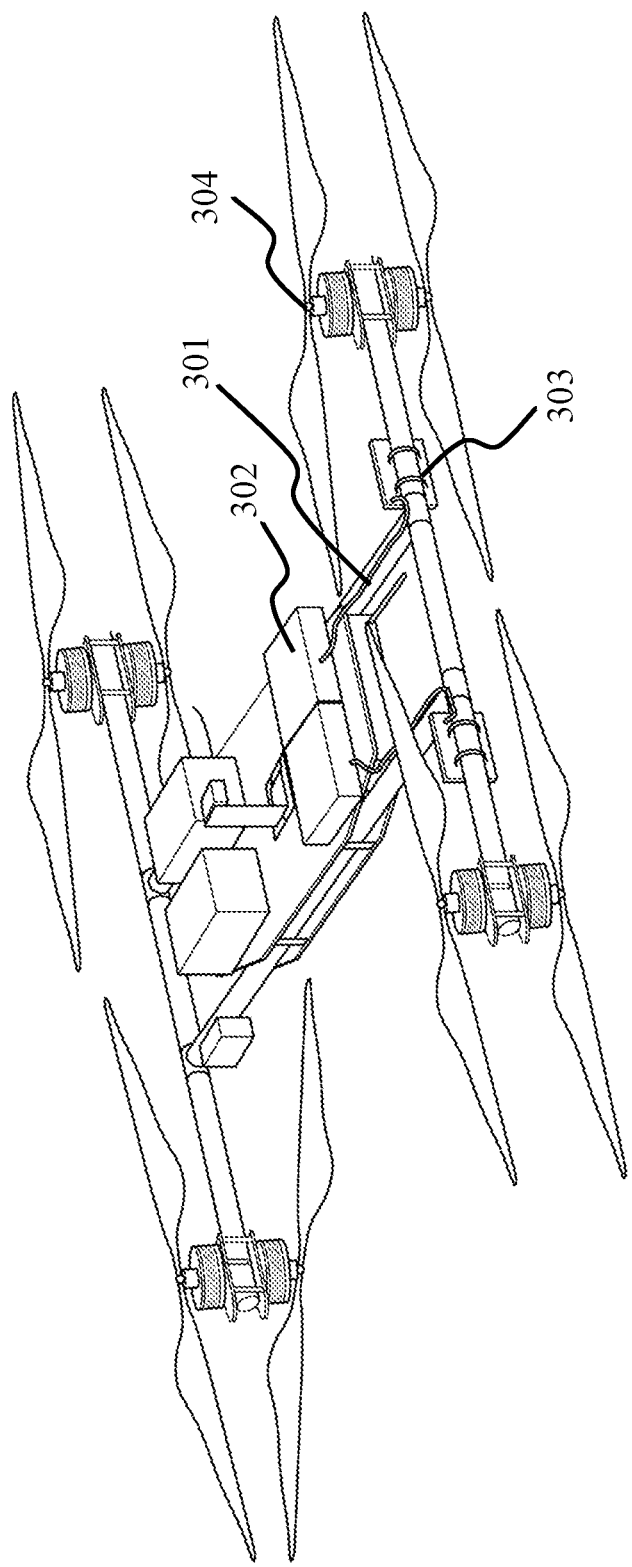
FIG. 3 is a view of a UAV of the present invention.

In some embodiments, systems of the present invention include a novel heat management system as shown in detail in FIG. 3. Electronic UAVs or other electrically powered vehicles typically include many components that require heat dissipation in order to operate. Such components include, but are not limited to, electric motors, electric motor controllers, batteries, power management systems, DC-DC converters, radio transceivers, field effect transistors (FETs), control computers, and payload assemblies (especially payload assemblies that require active cooling). Typical methods of dissipating heat, also called "sinking" heat, include passive and active heat sinking. Passive heat sinking involves the use of static metal components with high thermal conductivity to conductively remove thermal energy from a heat-producing component, from where it dissipates harmlessly into the surrounding air. Passive metal components may in some embodiments include fins, designed to maximize surface area, from which heat may easily dissipate into the air, while minimizing volume. Active heat sinking involves the use of active components, for example fans or water pumps, sometimes in combination with passive metal heat sinks, to further remove air by conductive or convective means from a component. In some embodiments, active cooling includes a metal heat sink fixedly attached to a heat-producing component, with a fan fixedly attached to the passive metal heat sink, designed to circulate air past the heat sink. In other embodiments, active cooling includes a metal plate fixedly attached to a heat-producing component, with a pipe fused to the metal plate, through which water or some other refrigerated fluid may be passed. The heat producing component then conductively dissipates heat into the metal plate, and then on into the flow of water. The heat is then carried away from the heat producing component by the water, and removed from the water for example by a refrigeration means.

Conventional heat sinking methods have disadvantages when used with systems of the present invention, for example with UAVs. Passive heating necessarily adds increasing amounts of weight, as more surface area is required to dissipate more heat. Active heating is lighter, but water pumps are impractical, and fans add more moving parts, increase energy consumption, and may impart undesirable moments on the aircraft when in flight. An exemplary heat management system of the present invention is shown in FIG. 3. Heat producing components 302 are mounted in some embodiments near the center of gravity of the UAV. The heat producing components 302 have heat pipes 301 fixedly attached. The heat pipes 301 may be constructed from any suitable material known in the art, but optimally comprise a metal with high thermal conductivity, for example copper or aluminum. The heat pipes 301 are in turn fixedly connected to metal heat sinks 303, which are fixed to the frame of the UAV, positioned beneath the electric rotors 304. As the UAV flies, the rotors 304 spin, blowing air downward in order to generate thrust, driving the UAV upward. The air blows past the heat sinks 303, convectively removing heat from the surface of the metal heat sinks 303 and in turn from the heat-producing components 302. In this way, the heat management system of the present invention includes some of the advantages of active heat systems (convective heat dissipation using a fan) without adding unnecessary weight, moving parts, or energy consumption to the vehicle. As a further benefit, the heat pipes 301 add further ruggedness to the airframe, by virtue of reinforcing the structure along the pieces of the airframe to which they are connected.

Figure 6:
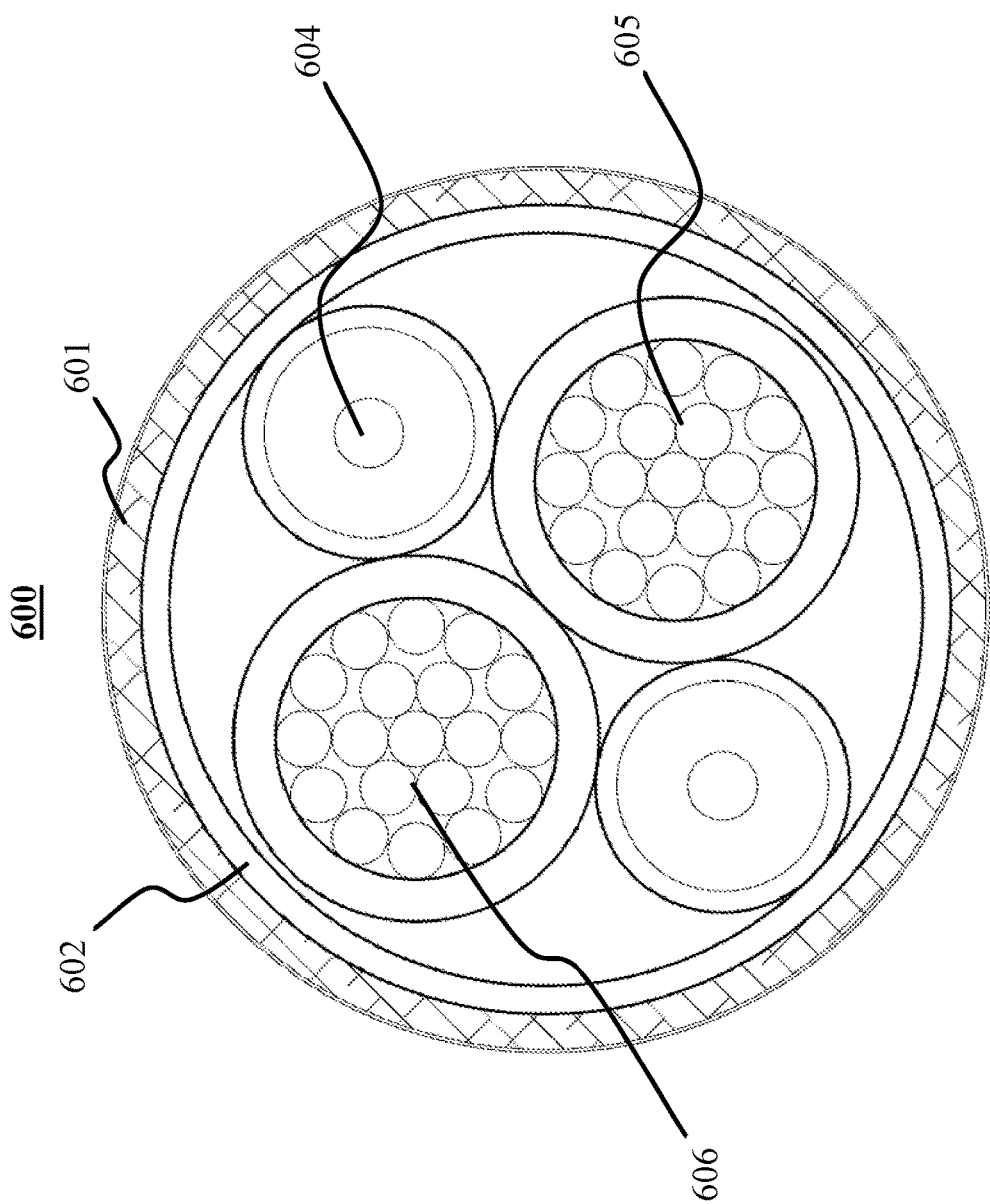
FIG. 6 is a cross-sectional view of a tether of the present invention.

Some embodiments of the present invention relate to a cable structure for powering and controlling a UAV via a tether. An exemplary tether of the present invention is shown in FIG. 6. As depicted, the tether includes two fiber optic cables 604, and two power conducting cables 605 and 606. The fiber optic cables may be any fiber optic cables known in the art, and may each include a single fiber channel or multiple fiber channels. Each channel may be single mode or multi-mode. The power conducting cables 605 and 606 may be stranded, as they are shown in the exemplary embodiment depicted in FIG. 6. In some embodiments, the tether may include a third power conducting cable configured to be a ground reference or return for high positive and negative voltages. The power conducting cables may be made of any material with suitably high conductivity, including but not limited to copper, aluminum, silver, or a superconducting material. In some embodiments, each cable is insulated, for example with a jacket. Suitable jacket materials include PTFE or extruded polyester. The depicted cable structure advantageously minimizes power loss over the length of the cable, while also still being relatively lightweight. In some embodiments, tethered UAVs of the present invention are powered via direct current power transmitted over the tether. The direct current power may in some embodiments be a high voltage direct current, for example, but not limited to, +/−200 VDC, +/−400 VDC, or +/−600 VDC. In some embodiments, the high voltage direct current may be single ended, for example one wire at ground and one wire at a high DC voltage. Exemplary suitable voltages for single ended configurations include, but are not limited to, +800 VDC/GND, +1000 VDC/GND or any other suitable voltage combinations. In other embodiments, the high voltage direct current may be double ended, comprising three wires—one at a high positive voltage, for example +400V, one at a very high negative voltage, for example −400V, and a third at ground, or 0V. In the embodiment shown in FIG. 6, the wires 605 and 606 may interchangeably carry the high positive voltage and ground, for example +800V and GND.

The tether, which comprises the various conducting and fiber optic cables, also may comprise an outer jacket 601 and an inner jacket 602. The outer jacket 601 may be made for example from a water-proof or insulating material, such as plastic, rubber, or PVC, PTFE, or Polyester. The inner jacket 602 may be another insulating material, or may alternatively be made of a conducting material, for example aluminum, or a strengthening material, for example Kevlar, to provide additional strength to the entire assembly.

UAVs of the present invention may include one or more DC-DC converters for converting high voltage DC from the tether to a lower voltage usable by the systems of the UAV. For example, UAVs of the present invention may use one or more Vicor Bus Converter Modules (BCM). In one embodiment, multiple DC-DC converters are arranged in a series/parallel arrangement. One exemplary embodiment comprises eight BCM chips capable of transforming the input voltage, for example 400V, into a lower output voltage, for example 50V. In one example, the first four having inputs connected in parallel to the +400V and ground lines, and the other four having inputs connected in parallel to the ground and −400V lines. All eight then have their outputs shunted together, providing a 50V power rail for use by systems on the UAV.

The advantage of such arrangements is to minimize power loss in the tether. As is known in the art, the long wires of the tether function substantially as a resistor, whose resistance rises with increasing tether length. At a higher voltage, the SSS is capable of sending more power across the tether with a lower total current, resulting in a less voltage drop in the resistive tether, and therefore less power lost to the system. In one example, a UAV of the present invention consumes approximately 8 kW of power, and the tether dissipates another 1.6 kW of power as heat because of the resistance in the tether.

The tether and spool may advantageously be arranged such that the total length of the tether may be wound around the spool a limited number of times. In one embodiment, the tether may be wrapped a maximum of four times. In other embodiments, the tether may be wrapped a maximum of three times, two times, or once. Essentially, the length and radius of the spool may be sized such that the tether, when fully reeled in and wound around the spool, will have a maximum depth of four, three, two, or one layers. Such a limited-wrap system carries advantages for heat dissipation, which is important when the tether itself is dissipating 1.6 kW of heat. The spool may be constructed of a metal with high thermal conductivity, for example copper or aluminum. In two-wrap embodiments, the inner layer of tether dissipates heat to the spool, and the outer layer of tether dissipates heat to the air inside the SSS. No tether is surrounded by other layers of tether completely, allowing for proper heat dissipation without unnecessarily increasing the size of the spool.

Figure 4A:
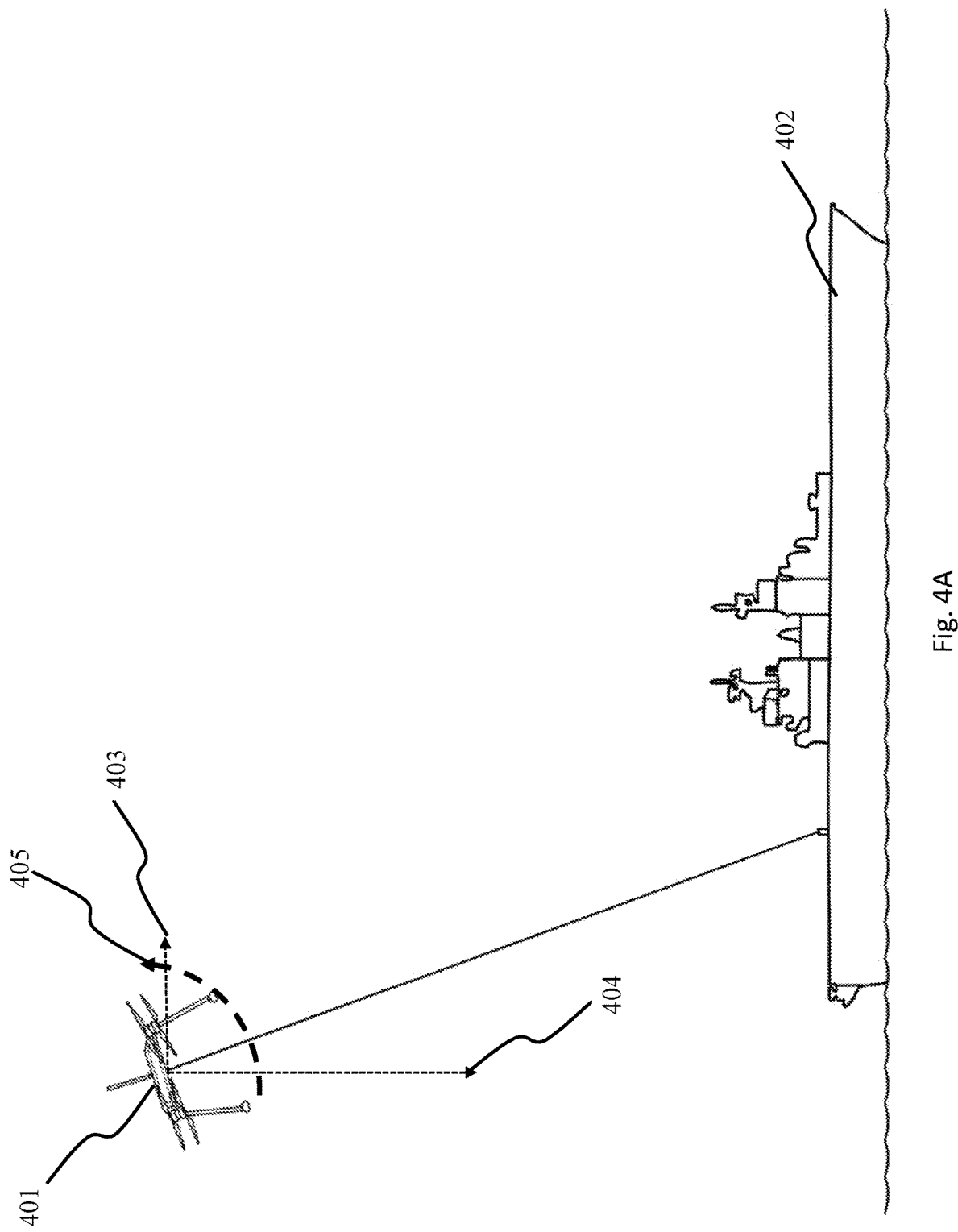
FIG. 4A and FIG. 4B are force vector diagrams of exemplary embodiments of the present invention.
Figure 4B:
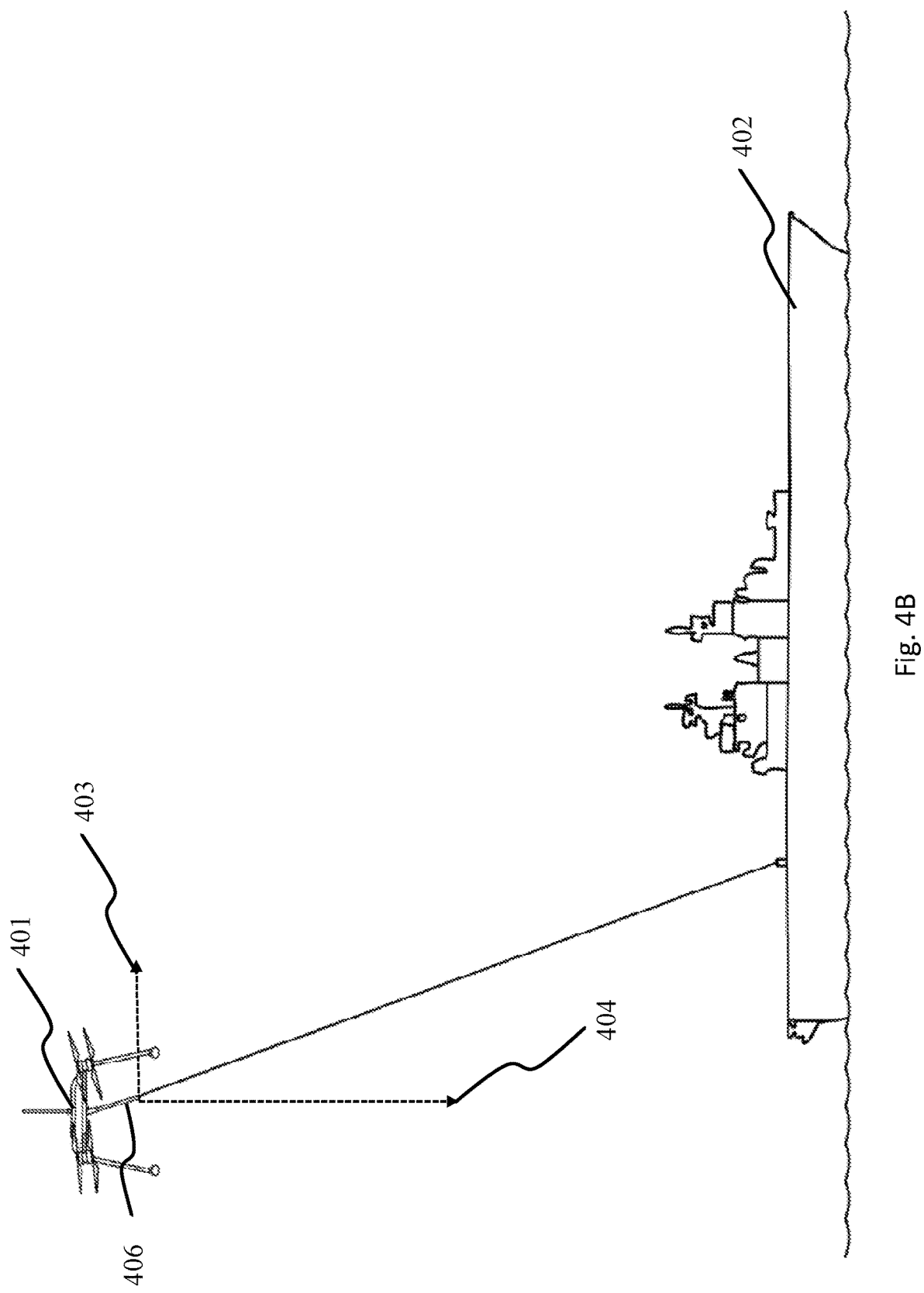

Tethers of the present invention present mechanical difficulties as well. When a tether is fixedly anchored to the bottom of an aircraft, and when the aircraft unintentionally or intentionally wanders into a position where it is no longer directly over its base, the tether will impart undesirable forces and moments on the UAV, which make navigation and operation difficult. An exemplary diagram is shown in FIG. 4A. In the depicted example, a UAV 401 which falls behind as its base 402 moves ahead might pitch upward, as the tether imparts a force vector with a forward component parallel to the ground 403 and a downward component perpendicular to the ground 404. Because the tether is fixed substantially normal to the bottom of the UAV, the tether also imparts a moment 405 to the UAV, which pitches it upward. With fixed rotors, such a pitch would lead to further backward motion by the UAV, straining the tether and exacerbating any navigational error. In some embodiments of the invention, the UAV may include a two-axis gimbal 406, as shown in FIG. 4B. Such a gimbal alleviates most or all of the moment, leaving only the horizontal and vertical translational forces on the UAV, which do not substantially impact aircraft attitude. In other embodiments, alternative structures may be used to mechanically decouple the tether from the aircraft. In one embodiment, a freely-rotating light spring connecting a service loop of the tether to the aircraft could be designed with enough thrust margin to compensate for the moment. In another embodiment, the tether may be attached to a D ring clip on the bottom of the aircraft.

Figure 5B:
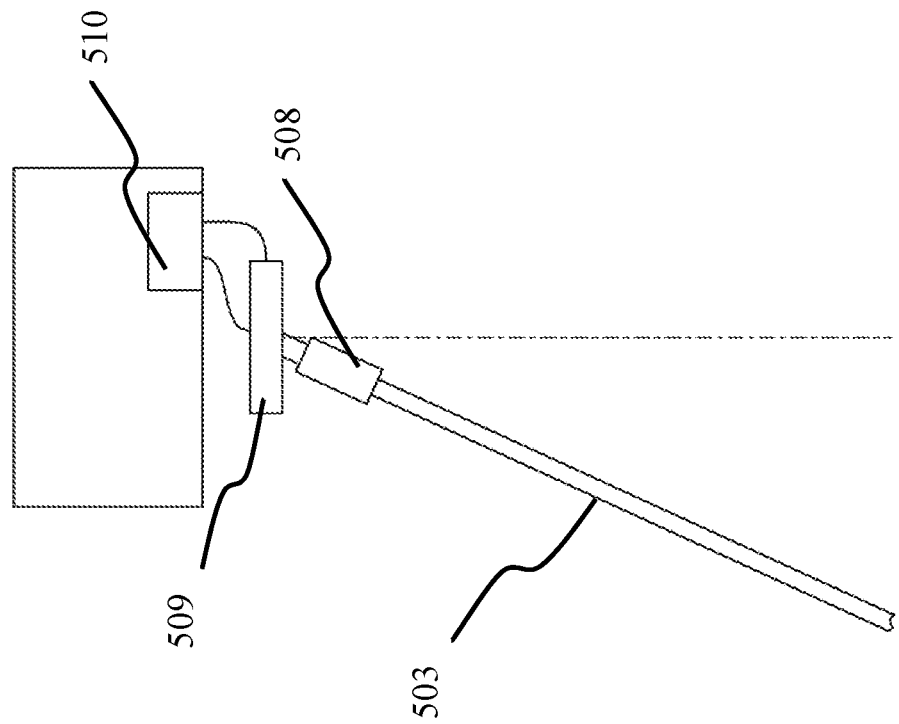
FIG. 5A, FIG. 5B, and FIG. 5C are exemplary embodiments of systems of the present invention.
Figure 5A:
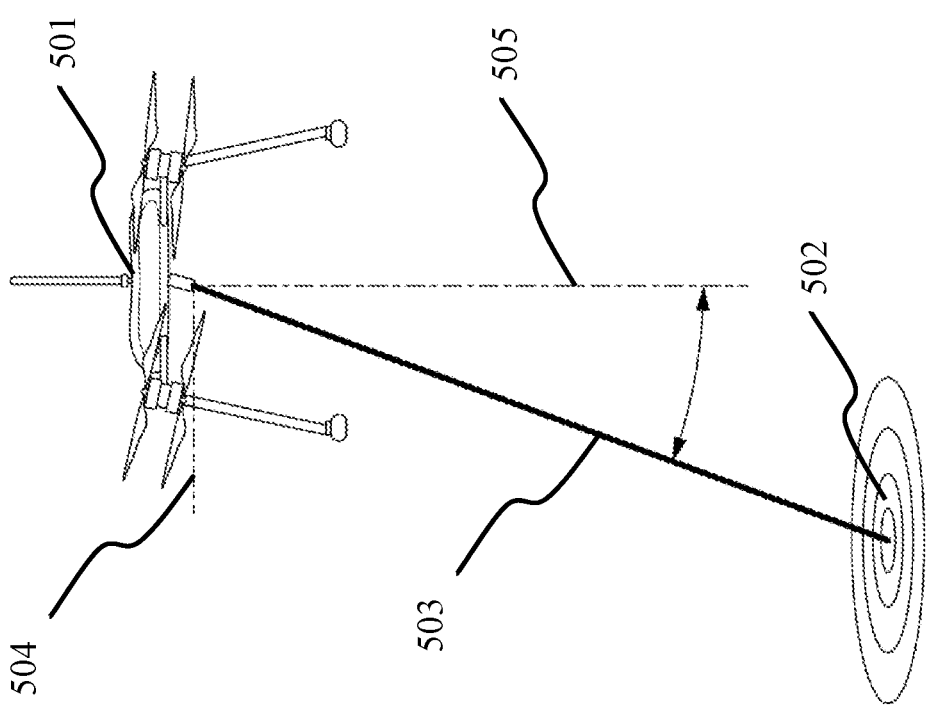

The gimbal improvement of the present invention in some embodiments may include additional benefits and expose other functionality. For example, as shown in FIG. 5A and FIG. 5B, a UAV 501 including a gimbal 508 connected to a gimbal position sensor 509 and tether 503 may derive an approximate position relative to its base 502 from the measured gimbal angle along the pitch and roll axes of the UAV. The angle may in some embodiments be reduced to its components in three dimensions 504 and 505 (and an additional axis not shown, orthogonal to the drawing). Based on a set of measurements including but not limited to the relative magnitudes, the approximate wind speed and direction, the current attitude of the UAV, the current altitude of the UAV, and the current length of the tether, the UAV can calculate its approximate relative position to the base 502 with reasonable accuracy. In some embodiments, the UAV is configured to calculate its position using the attitude of the UAV, the altitude of the UAV, the gimbal orientation, and the position of the base. In some embodiments, the UAV comprises a 2-axis gimbal 508 mounted in a two-axis gimbal position sensor 509. The gimbal position sensor 509 may for example comprise two rotational position sensors electrically connected to a processing unit 510, which is itself electrically connected to the flight controller for the UAV. In some embodiments, the position sensors are rotary encoders. In some embodiments, the position sensors may include one or more hall effect sensors, potentiometer sensors, piezoelectric sensors, or capacitive sensors, alone or in combination. The position sensors may return the measured position of the gimbal as digital values or as an analog voltage.

In one embodiment, the gimbal 508 is a one-axis gimbal, configured to rotate about a single axis. A UAV of the present invention could maintain correct attitude by using the single-axis gimbal to correct for pitch and roll, while controlling the yaw of the aircraft to keep the target within the beam pattern of the one or more antennas.

Approximate position measurements are advantageous for takeoff or landing of the UAV without the assistance of GPS. In some situations, for example during poor weather, a GPS receiver may have difficulty receiving the required signals. Various other circumstances may cause GPS position to be unavailable, for example hardware failure in the GPS receiver or active denial of GPS signal by an adversary. In such instances, the geometric gimbal measurement-based system of the present invention may provide a valuable fail-safe.

In some embodiments, the gimbal 508 may further include one or more antennas in a coaxial arrangement. In such embodiments, arranging multiple antennas vertically within the gimbal can provide omnidirectional coverage. Because the weight of the tether pulls the gimbal substantially vertical, a coaxial antenna configuration within or around the gimbal, with the antennas oriented vertically and positioned along the circumference of the gimbal, provides omnidirectional antenna coverage. Some embodiments include one antenna positioned in the gimbal, but embodiments of the present invention may include two, three, four, or five or more antennas positioned in or substantially in a gimbal of the present invention. Some embodiments of the present invention include one or more panel antennas, which can be square, rectangular, or any other suitable shape. Panel antennas may be mounted about the circumference of the gimbal. In some embodiments, signals transmitted to or received by the one or more antennas have noise removed by a filter, for example, but not limited to, a low-pass, bandpass, high-pass or low bandpass filter. In some embodiments, two of the antennas positioned below the aircraft may be connected to different systems and, in close proximity, might introduce undesirable cross-talk into the system. Therefore, in some embodiments, a first antenna is positioned substantially inside a gimbal of the present invention, while a second antenna is positioned further down the tether, in the null of the first antenna. Such an arrangement would mitigate the need for signal filtering and isolation because cross talk would be physically impossible in the configured orientation. This arrangement further may increase performance, reduce system weight, and reduce system complexity. In some embodiments, a tether may itself be a transmitting and/or receiving antenna for one or more systems or signals of the present invention. In one embodiment, a tether may comprise a transmitting and/or receiving antenna for long-wave radio, for example having a frequency range from 3 kHz to 525 kHz, or from 30 kHz to 300 kHz, or any other suitable frequency.

Figure 5C:
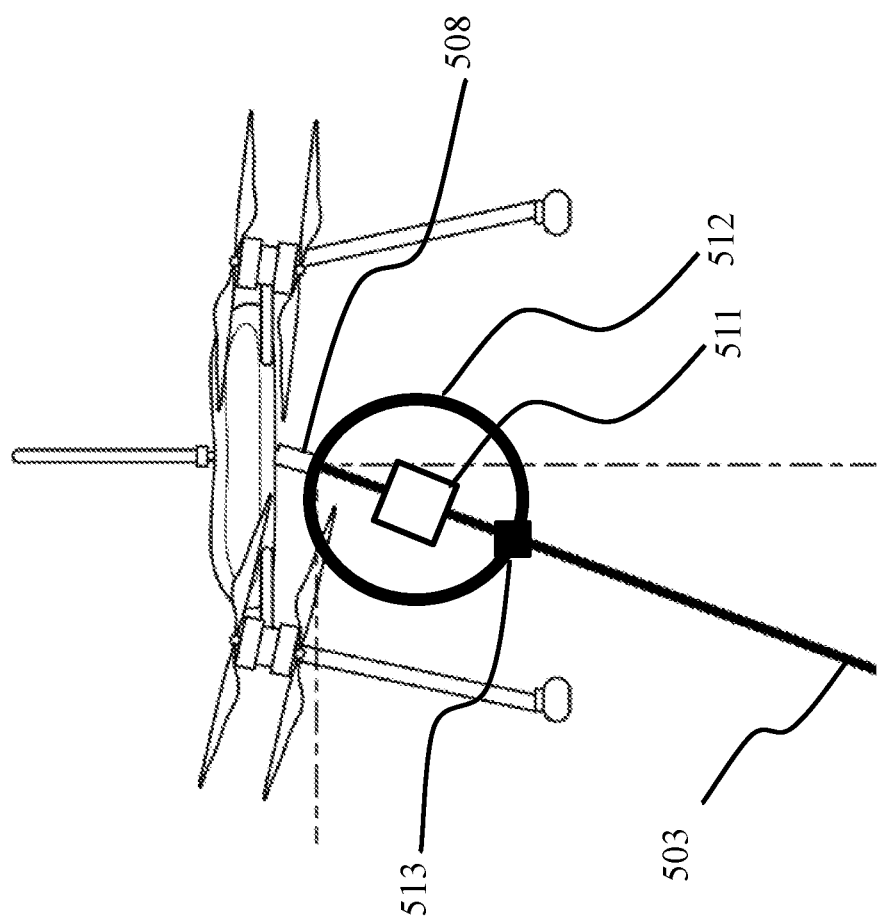

With reference now to FIG. 5C, some or all of the one or more antennas may be further positioned within a sheath 512 (e.g. radome), for example made of fiberglass or any other suitable material, preferably a substantially RF-transparent material. Although the gimbal 508 is physically connected to the tether 503, the weight of the tether imparts strain, and therefore in some embodiments the tether is not directly connected to the one or more antennas 511 positioned near the gimbal. In one embodiment, the one or more antennas 511 are surrounded by a fiberglass sheath 512, and the tether 503 is bonded to the sheath 512 at a tether attachment point 513, so that the sheath acts as a strain reliever, bearing the weight of the tether while allowing for the electrical and optical connections within the tether 503 to connect to the corresponding points on the UAV.

Systems of the present invention may further include one or more signaling antennas, configured to broadcast signals originating from an SSS from a higher altitude, and thus increasing the range of the signal. Similarly, higher altitude antennas are capable of receiving signals broadcast from further away. In some embodiments, particularly in situations where communication is highly directional, directional antennas may be used with systems and methods of the present invention. For example, in one embodiment, an antenna of the present invention has a beam sweep of 30 degrees horizontal by 30 degrees vertical. As discussed herein, "beam sweep" refers to the radiation pattern or antenna pattern used to describe the directional dependence of the strength of radio waves from the antenna or other source. Conventional systems manage directional antennas by separately rotating the antenna, or positioning the antenna on an actuated gimbal assembly to point the antenna appropriately at the one or more targets. Some embodiments of the present invention include an advantageous alternative, because directional antennas may be oriented by changing the pitch, yaw, roll, attitude, or altitude of a UAV of the present invention, thus allowing for dynamic repositioning of the one or more antennas in response to external stimuli. In some embodiments, a UAV of the present invention is configured to autonomously maintain an attitude and altitude optimal for maintaining the direction of the beam sweeps of one or more antennas. Such a configuration has the further advantage of removing unnecessary weight and complexity from the UAV, which would otherwise require one or more coaxial cable slip rings to allow for dynamic orientation of the one or more signaling antennas.

Systems of the present invention may include one or more barometric pressure sensors. UAVs of the present invention may include a barometric pressure sensor fixedly attached to the aircraft, which measures the air pressure outside the aircraft for the purposes of tracking altitude over long measurement periods, herein understood to be time periods greater than about 5 seconds. Fine, short measurement period altitude is calculated by integrating Z-axis acceleration measurements, for example from an onboard IMU. The onboard IMU might record and track acceleration measurements at a rate of 50 Hz, 100 Hz, 200 Hz, 400 Hz, 1 kHz, or 5 kHz. In some embodiments, IMU measurements are made at a faster rate and filtered to produce better noise performance.

Integrating acceleration over time from commonly available COTS IMUs introduces increasing amounts of error over time, which is problematic for longer-term flights. An on-board barometric pressure sensor can mitigate such error, because barometric pressure, measured precisely, typically remains relatively constant over periods of seconds to minutes. An on-board barometric pressure sensor may however introduce its own error over longer periods of several minutes to hours, where changes in ambient barometric pressure (for example from shifting atmospheric patterns) can significantly alter pressure-based altitude estimates. In some instances, such pressure shifts register as an error of as much as +/−400 ft. In order to correct for this problem, systems of the present invention may include a second barometric pressure sensor fixed to the SSS or near the deck of the ship to which the UAV is tethered. The UAV can then form an estimate of altitude based on the relative difference in barometric pressure between the aircraft-based sensor and the ground-based sensor, effectively canceling out any transient atmospheric effects. By using such a "ground reference" pressure, algorithms of the present invention can more accurately calculate and maintain tighter control over aircraft altitude. In one embodiment, a UAV of the present invention may calculate its current altitude based on the air pressure measured at the start of a flight, and then update the start pressure dynamically during flight based on updates received from the ground-based sensor.

One hazard presented by tethered UAVs in a nautical environment is the risk of the tether becoming ensnared in the mast structure of a ship, or the aircraft otherwise being in an "unrecoverable" state. Examples of such states include loss of aircraft control, loss of tether reel control, emergency crash of the aircraft to prevent collision with manned assets, loss of power to the aircraft, or loss of communication to the aircraft. In such situations, keeping the aircraft attached to the tether and operating risks further damage to the aircraft, to the ship, or otherwise. For this reason, systems of the present invention may include an automated tether cutter within the SSS, so that the tether can be easily cut in dangerous situations.

Figure 7:
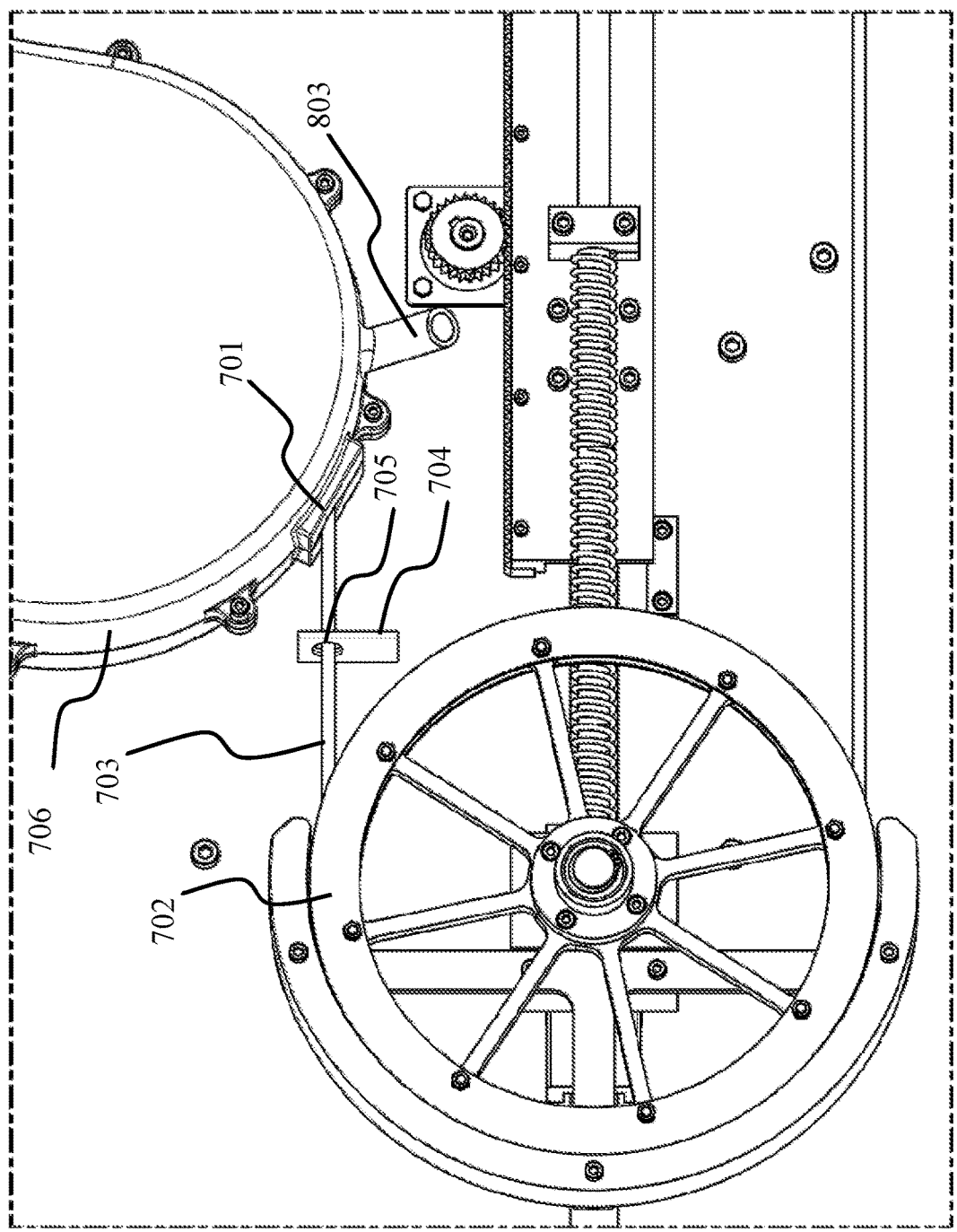
FIG. 7 is a diagram of part of an exemplary system of the present invention.

An exemplary embodiment of a tether cutter of the present invention is shown in FIG. 7. The tether 703 enters the SSS through an aperture 701 in the protective housing 706 around the pulley closest to the fairlead (not shown). In some embodiments, the aperture 701 includes a tether wiper or squeegee mechanism, for example a set of rubber or flexible polymer flaps surrounding the tether, configured to wipe water from the tether 703 as it passes through the aperture 701. Water may then advantageously be kept away from the inner components of the SSS, including pulley 702. The cutter 704 may be positioned for example between the aperture 701 and the pulley 702. In other embodiments, the cutter may be positioned between the fairlead and the first pulley, or may be integrated into the bottom of the fairlead. In some embodiments, the tether cutter may be positioned on top of the fairlead, or immediately before the drum. In some embodiments, an SSS of the present invention may include multiple tether cutters in different positions. The cutter 704 itself may include a hole or aperture 705 through which the tether 703 passes. When activated, the tether cutter 704 will extend a blade into the hold 705, cutting the tether 703 and releasing the UAV (not shown). The tether cutter may be actuated for example with a solenoid, a servo motor, a rack and pinion, or a small explosive charge.

In the event that the tether is cut, UAVs of the present invention may fall into the water or (if an optional battery pack is installed) may implement an emergency landing procedure. Failed UAVs are ideally recovered after they fall, for cost and security purposes. In some embodiments, a system of the present invention includes a water landing recovery float and/or a recovery beacon for keeping the failed UAV afloat and for assisting crews in its recovery. In some embodiments, the recovery float is inflated, with air or a compressed gas so that it takes up less volume and mass on the UAV when not in use. In some embodiments, the recovery beacon includes one or more radio broadcast components, configured to send out a periodic signal when the recovery float is deployed and power to the UAV is lost. In some embodiments, the float and beacon both automatically deploy or are activated when the UAV is substantially in contact with water. In some embodiments, the float and beacon both automatically deploy when the UAV detects that the tether has been cut.

Figure 8:
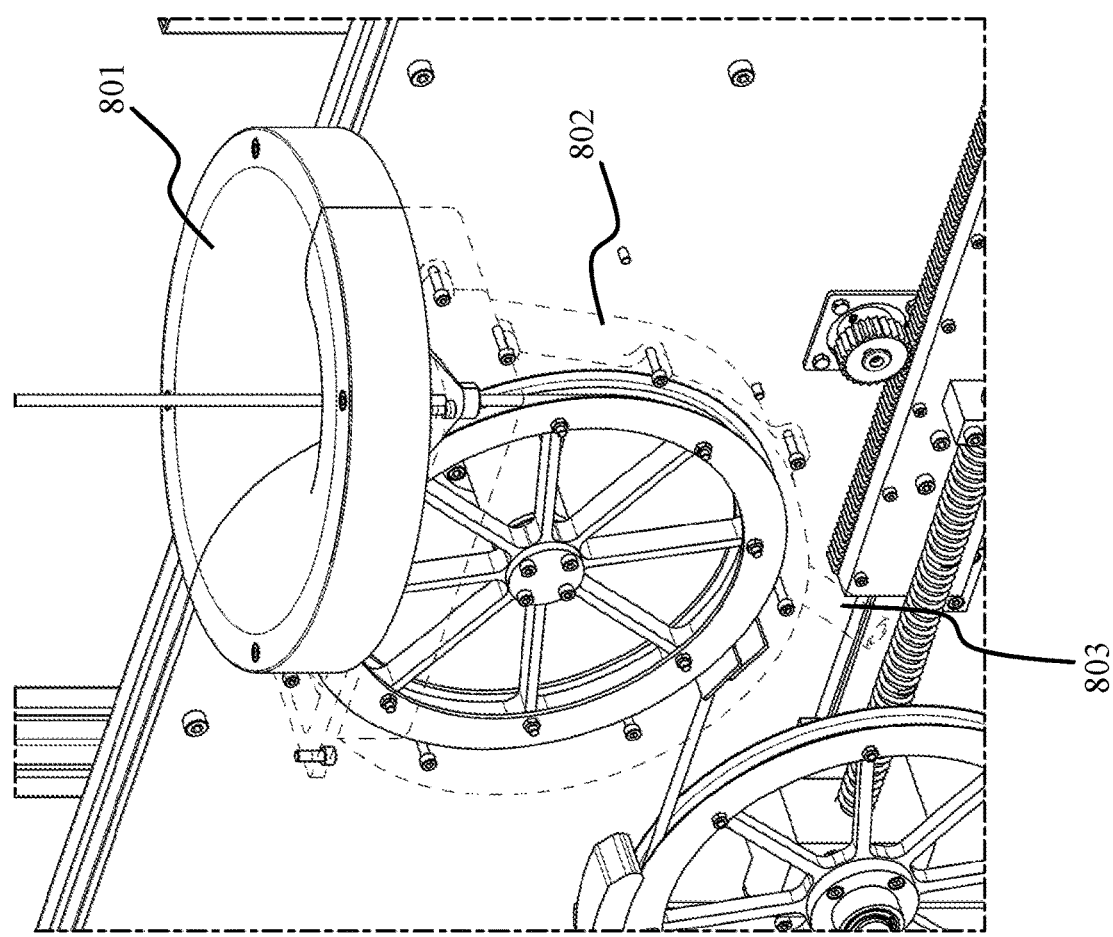
FIG. 8 is a diagram of part of an exemplary system of the present invention.

Referring now to FIG. 8, the SSS may include a fairlead 801, configured to minimize friction on the tether as it is reeled into or out of the SSS. Conventional fairleads are structured such that they reduce friction, but still allow enough bending in the tether so as not to violate the minimum bend radius allowed by tethers of the present invention. The trumpet-shaped fairlead of some embodiments of the present invention is therefore calibrated to not violate the minimum bend radius of the tether, and may for example be configured to allow a bend radius of at least five inches, at least six inches, at least eight inches, or at least ten inches.

The fairlead feeds the tether to and from the tether management system (TMS) which itself includes multiple novel concepts. The first of these features is the snorkel, one embodiment of which is shown in FIG. 8. As would be understood by a person skilled in the art, it is important to keep water from outside the SSS from seeping in to the inner workings of the SSS, where it might corrode metal parts or destroy electronics. The pulley closest to the fairlead 801 may therefore be positioned in a substantially water-tight housing or shroud 802, so that any water that splashes in to the fairlead or otherwise enters the SSS (for example condensed water droplets on the tether itself) will be trapped within the housing or shroud before reaching the remaining components of the SSS. A snorkel 803 is positioned in the lowermost part of the housing, so as to catch any water that enters the housing and direct it away from the SSS. In some embodiments, the snorkel is fluidly connected to tubing that routes water into a reservoir, or may alternatively be fluidly connected to a pump which actively pumps the water out of the SSS. As discussed elsewhere in this specification, the tether may in some embodiments pass through a wiper or squeegee to dry the tether before it enters the SSS, keeping any water inside the housing or sheath.

Figure 9A:
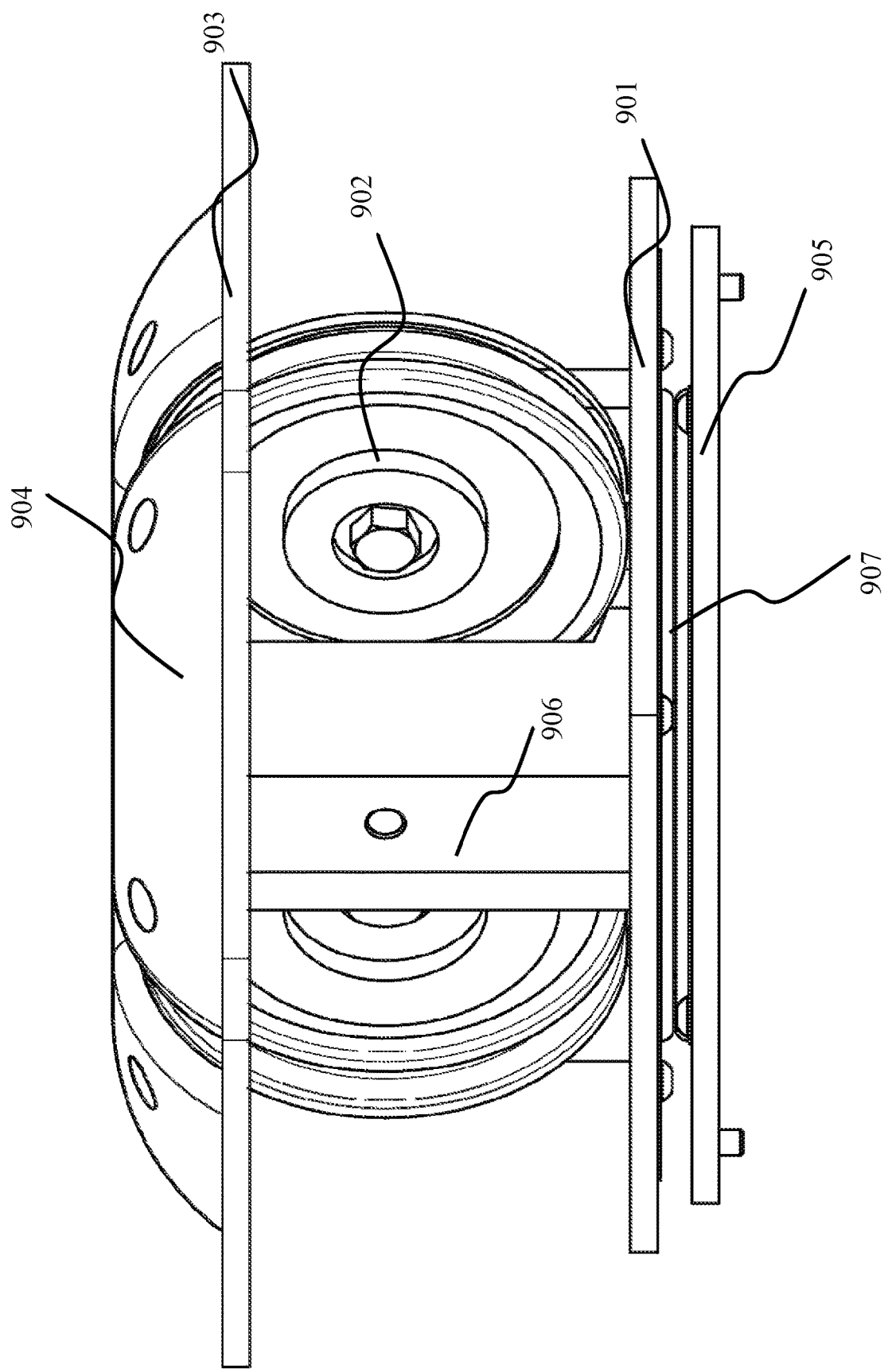
FIG. 9A, FIG. 9B, and FIG. 9C are views of an exemplary fairlead of the present invention.
Figure 9B:
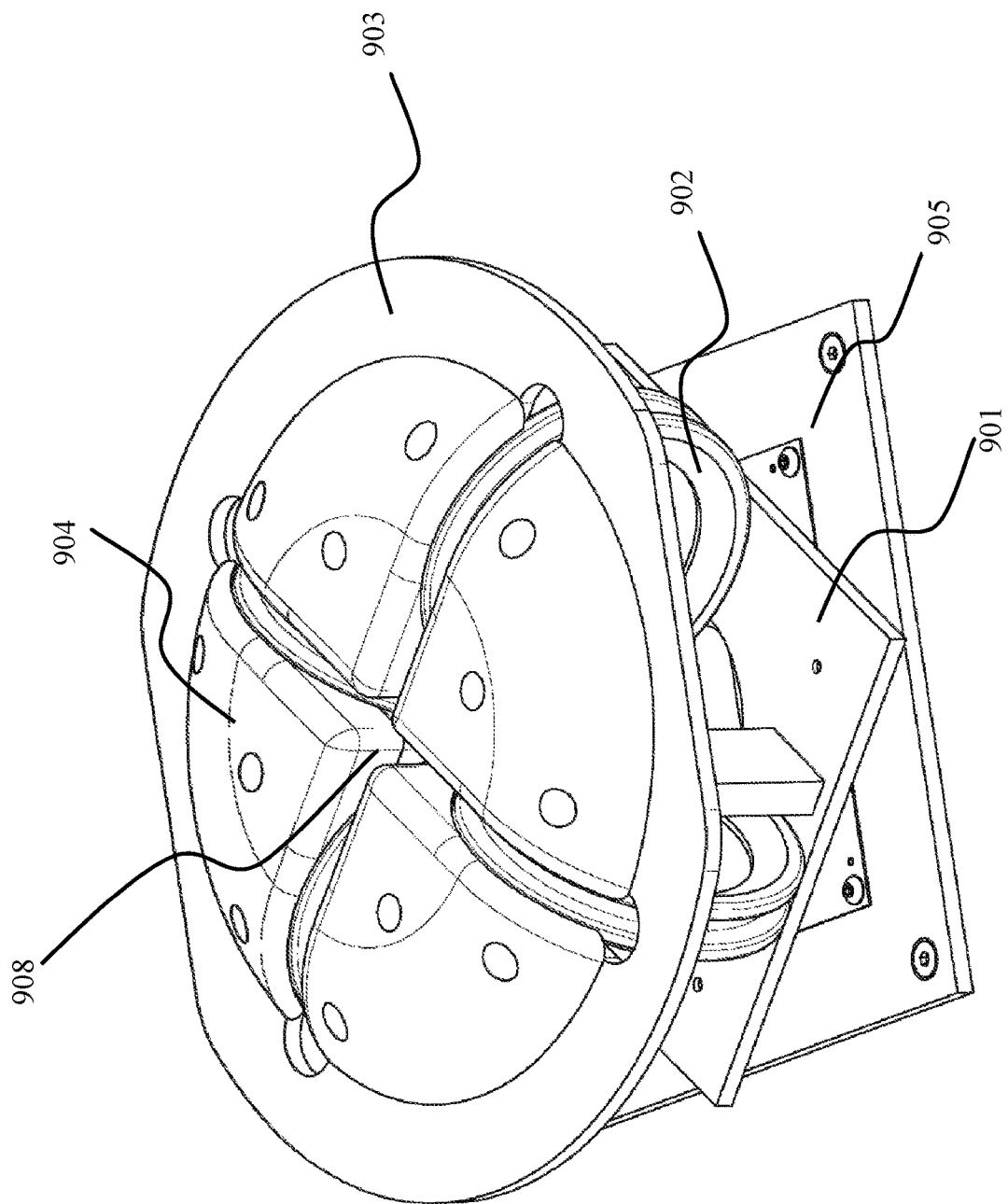
Figure 9C:
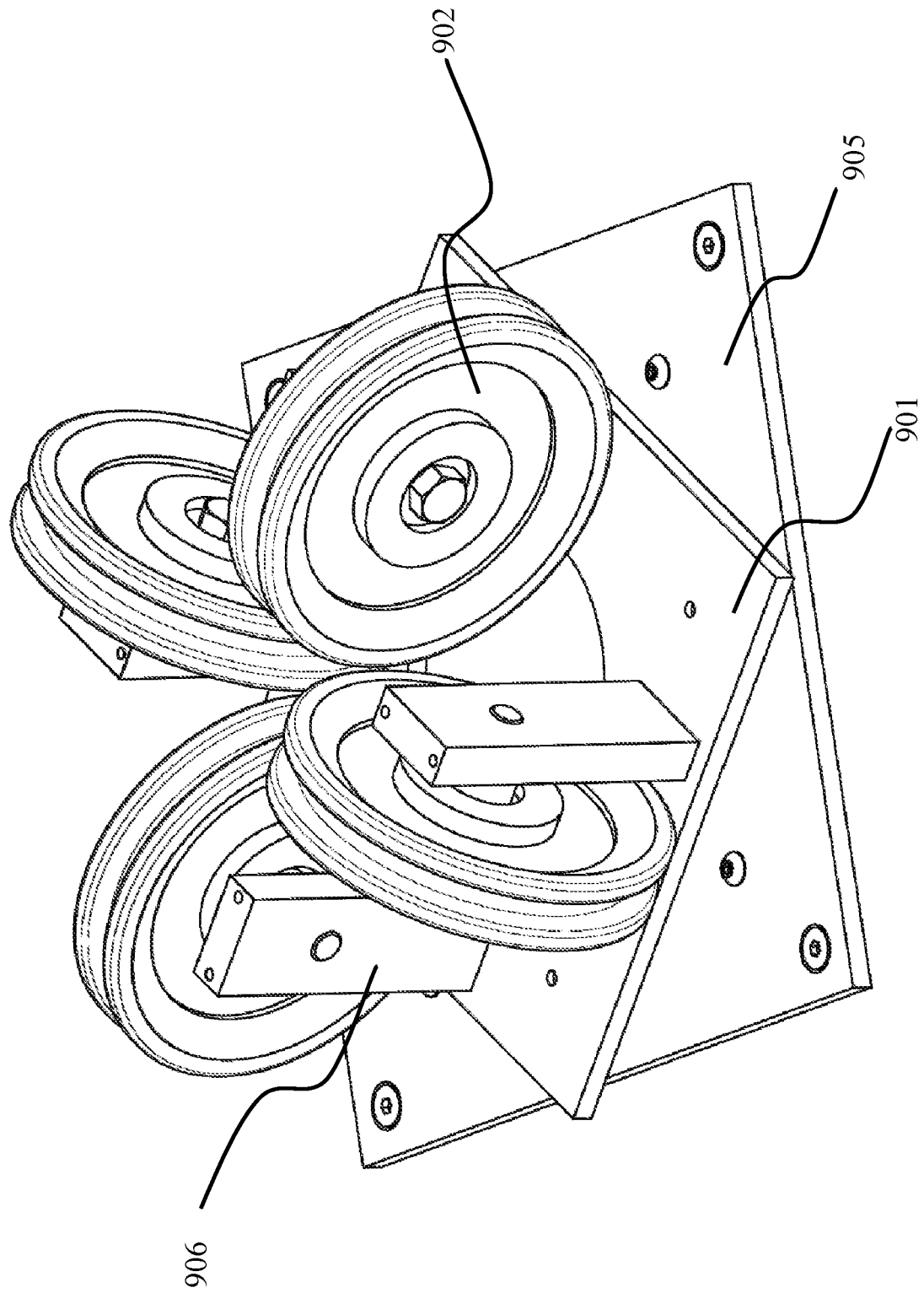

An alternative embodiment of a fairlead of the present invention is shown in FIG. 9A. This embodiment of the fairlead includes a plurality of pulleys 902 mounted to support elements 906, configured in this example at right angles to accept a tether. The pulleys are configured to freely rotate about the mounting point with the support element, for example using a bearing assembly or other suitable friction-reduction device. The support elements 906 are fixedly attached to a bottom plate 901, which is itself connected to main plate 905 via a rotating element or bearing assembly 907, such that the bottom plate 901 and the rest of the assembly rotates freely about main plate 905. The support elements are also connected to top plate 903, which includes guide elements or bumpers 904 for guiding the tether into one of the pulleys 902. An alternate perspective view of the fairlead shown in FIG. 9B shows the aperture 908 through which the tether travels. Another alternate perspective view in FIG. 9C shows the fairlead assembly with the top plate and guide elements or bumpers hidden, in order to expose the inner structure of the assembly, which in this exemplary embodiment has four pulleys 902 positioned at 90-degree angles to one another. Although the depicted example has four pulleys it is understood that a fairlead of the present invention may comprise three, five, six, or more pulleys, positioned at regular angles from one another or in other configurations. Although in the depicted embodiment the pulleys 902 are shown anchored to a single support element 906, in some embodiments of a fairlead of the present invention, one or more of the pulleys may be anchored with two support elements positioned on either side of the pulley.

Figure 10:
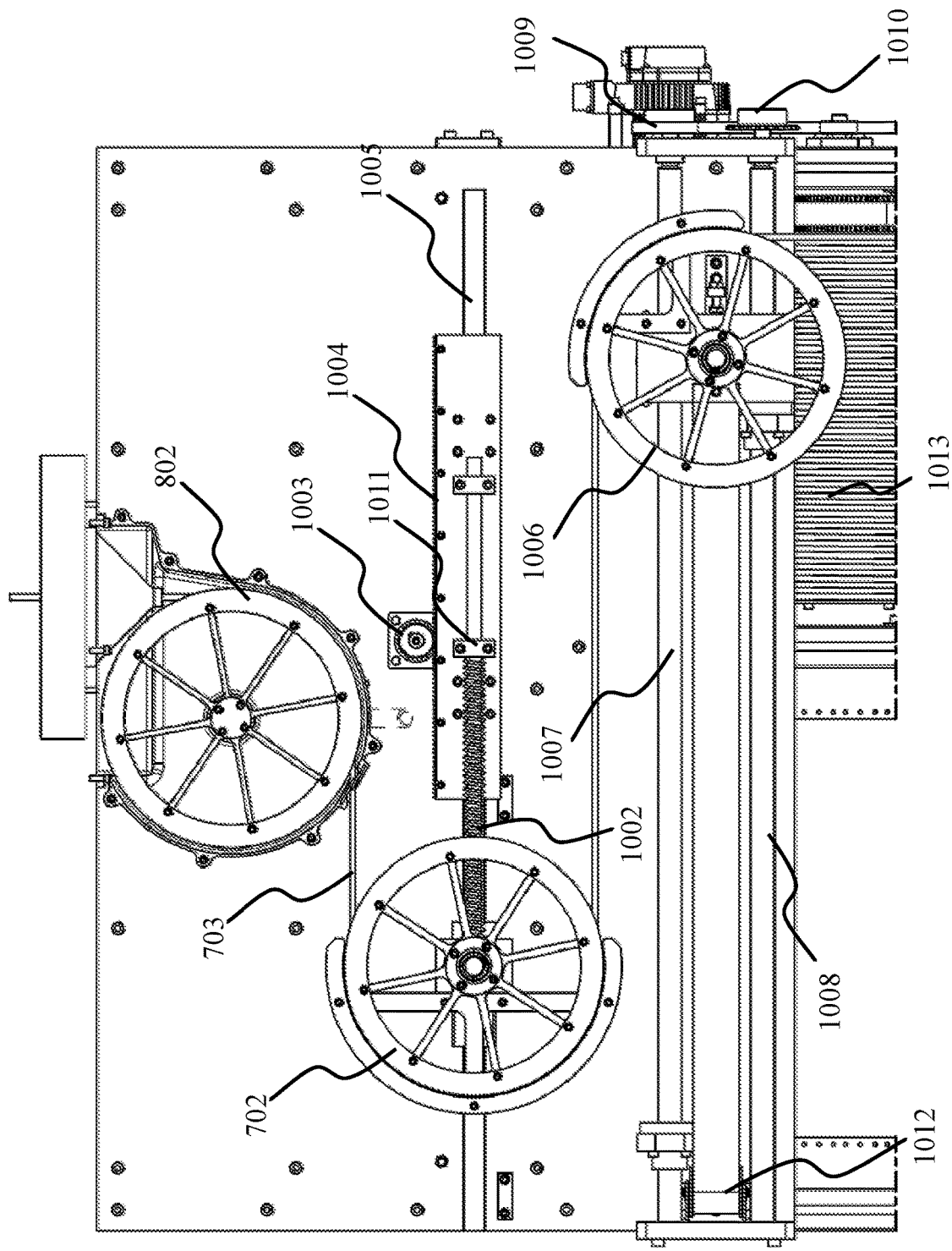
FIG. 10 is a diagram of part of an exemplary system of the present invention.

With reference now to FIG. 10, an additional view of certain novel features of a TMS of an SSS of the present invention are shown. After passing out of housing or shroud 802, the tether 703 wraps around first pulley 702, which is part of a novel horizontal dancer assembly of the present invention. Many paper and wire reeling operations use a "dancer" to keep a fixed tension in a line as it is reeled in or out. The tension in typical dancers is held substantially fixed by gravity pulling on a weight—when the slack in the line increases, the weight is able to pull the line further down, increasing tension. When the tension in the line increases, the weight is pulled up, decreasing tension until equilibrium is restored. Gravity-based dancers work well when the reel mechanism is substantially fixed, but when the reel mechanism is moving, for example in choppy seas, the gravitational force on the dancer is not necessarily constant relative to the motion of the reel assembly. This can lead to undesirable movement in the dancer and uncontrolled tension in the tether. In some embodiments, the dancer comprises a user-controlled variable tensioning mechanism, meaning the tension in the tether is adjustable. In other embodiments, the dancer comprises a fixed tensioning mechanism that keeps the tension in the tether at a constant preset level.

In the exemplary embodiment of a dancer or tensioning mechanism of the present invention shown in FIG. 10, the tension is maintained by balancing against the force of the spring 1002, which exerts a force on the pulley 702 according to its spring constant and its displacement, which can be controlled by the position of back plate 1011. The position of back plate 1011 is controlled by pinion motor 1003 and rack 1004. A control system of the invention can increase the desired tension in the line by moving the rack 1004 toward the pulley 702, thus moving the pulley 702 further down the sliding track 1005 and compressing the spring 1002. The control system can decrease the desired tension in the line by moving the rack 1004 away from pulley 702, thus allowing existing tension in the tether 703 to drive the pulley 702 closer to the second pulley 1006, decreasing tension in the tether 703 until it reaches equilibrium with the spring 1002 in its new position. In some embodiments, the position of the dancer is fed as an input to a control system of the present invention. The dancer position may be measured for example with a linear encoder, a potentiometer-based sensor, a hall-effect sensor, or any other suitable sensor known in the art. In some embodiments, the spring force is monitored by a control system of the present invention, for example with a load cell positioned in back plate 1011. Because the spring-based dancer system of the present invention does not depend on gravity to maintain tension, it is far more resilient against sudden movement of the TMS and/or SSS. In some embodiments, the dancer is oriented so that its travel is forward/aft in the ship, so as to reduce the influence of ship motion from the tether tension.

Another aspect of the TMS of certain embodiments of the present invention is the winding mechanism used to guide the tether 703 onto the spool 1013. As discussed earlier in the specification, the tether 703 should be wound carefully so that it does not overheat due to power dissipation over its length. The winding pulley 1006 is therefore fixed to two lead screws 1007 and 1008, which are in some embodiments right-hand threaded, but are driven in opposite directions by gears 1009 and 1010, guided by a single belt or chain. Because the corresponding nuts are at opposite ends of the lead screws, the two screws guide the pulley 1006 along the winding axis of the spool. A constant force spring 1012 pulls pulley 1006 toward the middle of the SSS to provide tension for the lead screws. In some embodiments, the winding pulley 1006 begins at the far end of the spool 1013 (furthest from the dancer pulley 702) then moves toward the center guided by the spring 1012 and the two lead screws 1007 and 1008. When the winding pulley reaches the end of the spool 1013 (roughly the middle of the SSS shown in FIG. 10), there is a changeover point, after which the level winder reverses direction and goes back to where it started. In one embodiment, the changeover is commanded by counting the number of drum rotations. In another embodiment, the changeover is commanded using input from active position sensors. A solution with two lead screws, as depicted in the exemplary embodiment of FIG. 10, is capable of accurate control of travel in the level winder even under the extreme forces imparted by embodiments and implementations of the present invention. With exceptionally long and heavy tethers, significant linear forces are necessary to drive the winding pulley 1006 back and forth along the axis of the spool with precision. Typical level winding mechanisms are too flimsy to withstand these forces and are insufficient for systems of the present invention.

In this way, the winding mechanism ensures that the tether is wound neatly around the spool and unwound neatly from the spool, thereby preventing tangling in the spool and ensuring that the tether may be wound completely around the spool with no part of the tether "buried" within other layers of tether. In other words, as described earlier in the specification, all sections of tether wound around the spool are in direct contact either with ambient air or with the outer surface of the spool. In some embodiments, the single belt or chain is driven by an electric motor, for example a brushless DC motor (BLDC). In some embodiments, the position of and/or speed of the motor is tightly controlled, for example using a hall-effect sensor or linear encoder. In some embodiments, a fixed gearing configuration is used between the level winder and the drum in order to ensure a precise winding pattern.

As would be understood by a person skilled in the art, in some applications, a tether for connecting and powering a UAV from a fixed ground position would ideally be configured to accommodate rotational forces on the tether by use of a slip-ring or other rotary coupler. Such a device allows for one end of a multi-wire cable to twist without imparting that rotational force on the other end of the cable. Because tethers of the present invention may comprise one or more copper or electrically conductive wires and one or more fiber optic cables, embodiments of the present invention may include both a slip ring (for the electrically conductive wires) and a fiber optic rotary joint (FORJ) for the fiber optic cables. In one embodiment, the slip ring is configured to be hollow, and the FORJ is positioned inside a cavity in the slip ring. Slip rings of the present invention may be configured for one conductor, two conductors, three conductors, or four or more conductors. FORJs of the present invention may be configured for one fiber, two fibers, or three or more fibers.

Figure 11:
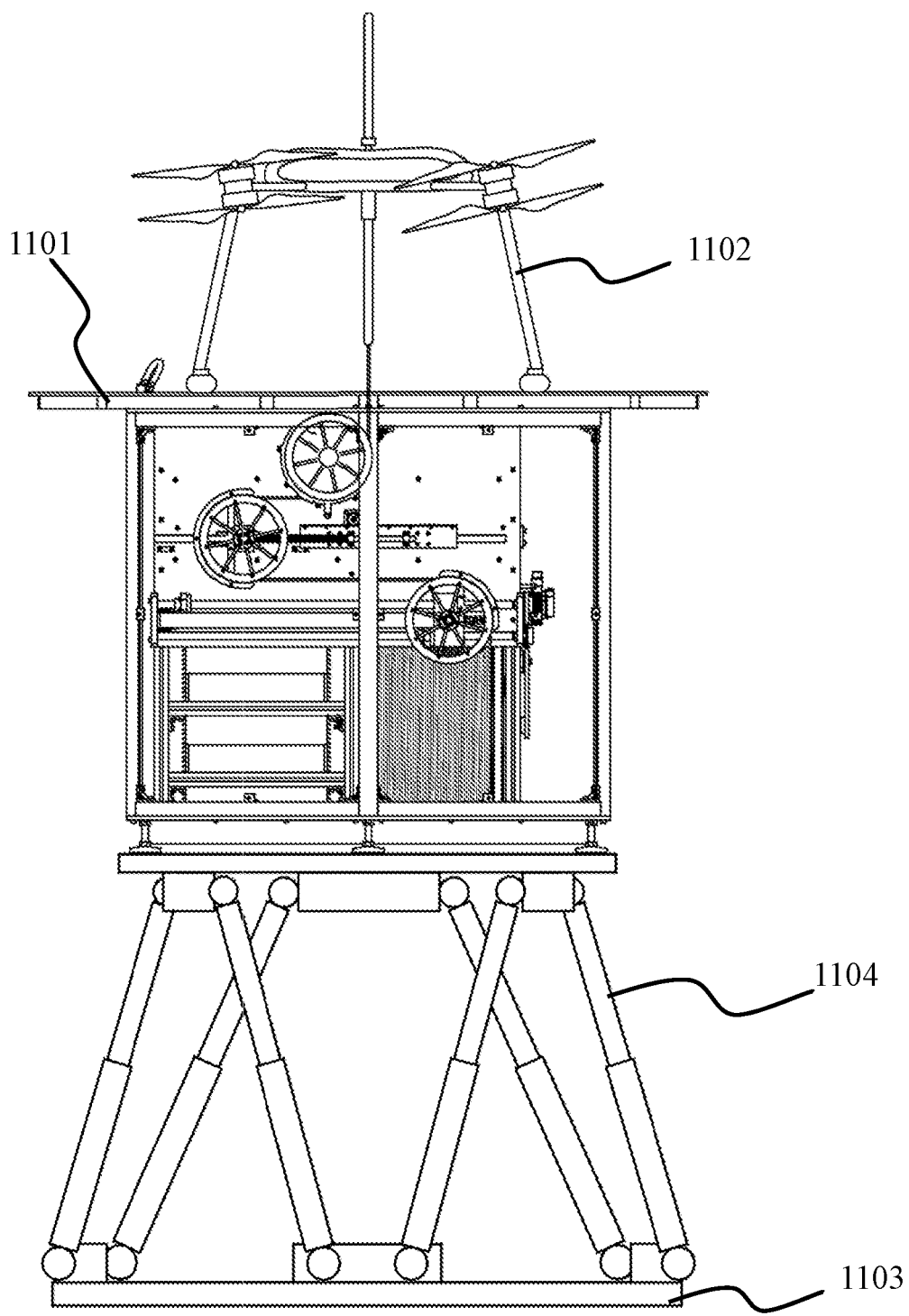
FIG. 11 is a diagram of a system of the present invention.

In some embodiments, an SSS of the present invention may be mounted on an actuated stabilizing surface, an example of which is shown in FIG. 11. As shown, the UAV 1102 is ideally launched from and landed on a platform 1101 that is substantially level. Landing on a tilted platform, in particular, is more difficult, even when connected to a retracting tether. An off-balance landing risks damaging the aircraft, the platform, or both. The SSS may optionally be mounted on a stabilizer, for example with a base 1103 fixedly attached to the ship, and a series of electronically controlled hydraulic actuators 1104 designed to extend or retract in concert in order to keep the SSS substantially level with respect to gravity. In this way, the attitude of the platform 1101 will be substantially level at all times. Stabilization of the SSS may also be achieved for example by mounting the SSS in a hemispherical cavity including a plurality of rollers. In some embodiments, the bulk of the SSS is fixedly mounted to the ship, while the landing platform is movable via a stabilization system.

Figure 12:
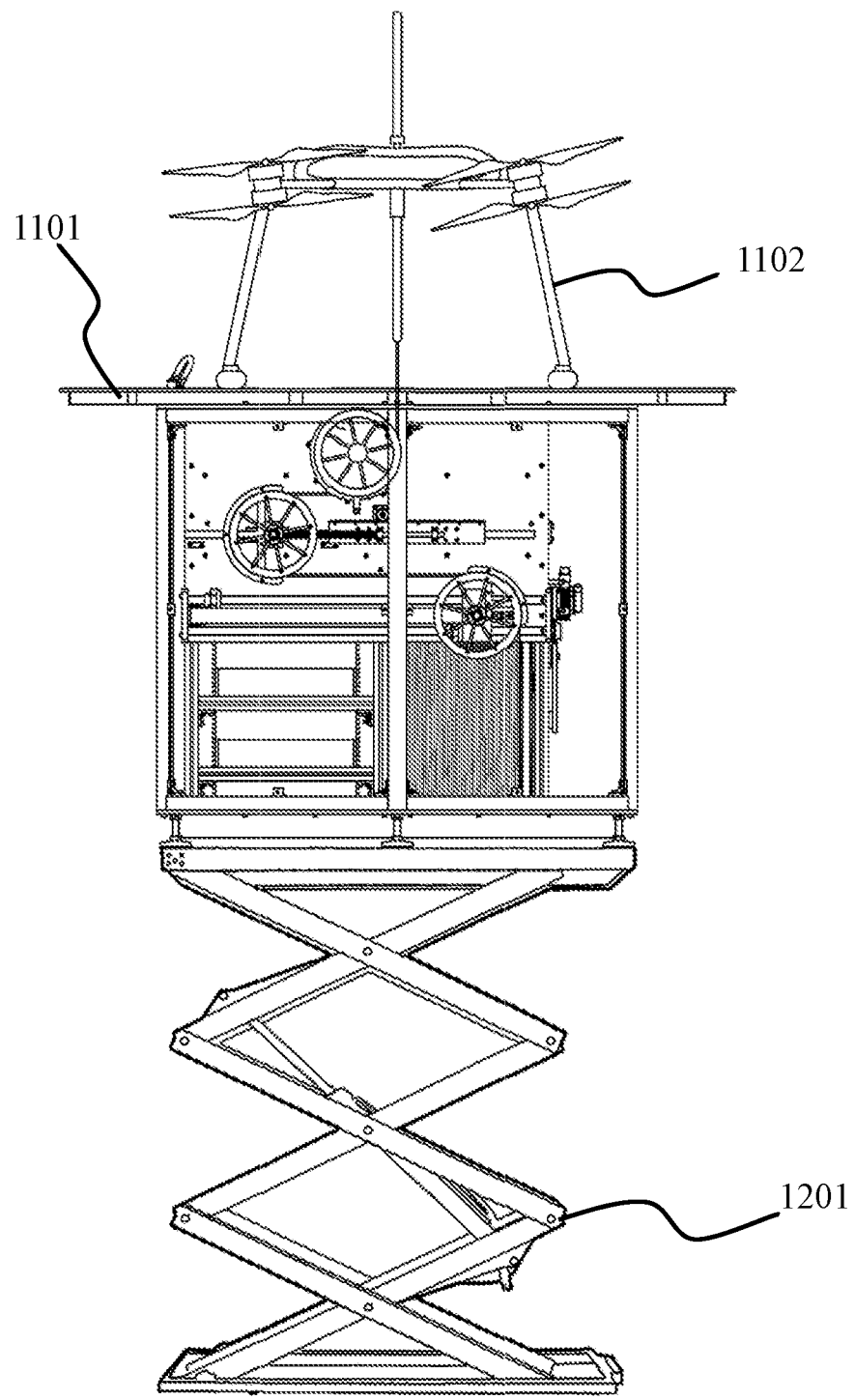
FIG. 12 is a diagram of a system of the present invention.

In some embodiments, an SSS of the present invention may be stored below the deck of a ship when not in use. In such embodiments, the SSS may be mounted to a scissor lift mechanism, as shown generally in FIG. 12. The scissor lift 1201 may retract to store the SSS when it is not in use, and may extend to bring the platform 1101 level with the deck of the ship. The SSS may alternatively be raised or lowered by other means as known in the art, including but not limited to a columnar hydraulic lift, or one or more electronically controlled winches. In some embodiments, only the landing platform is mounted to a scissor lift or other raising and lowering means, while the remainder of the SSS is fixedly mounted to the ship.

Figure 13:
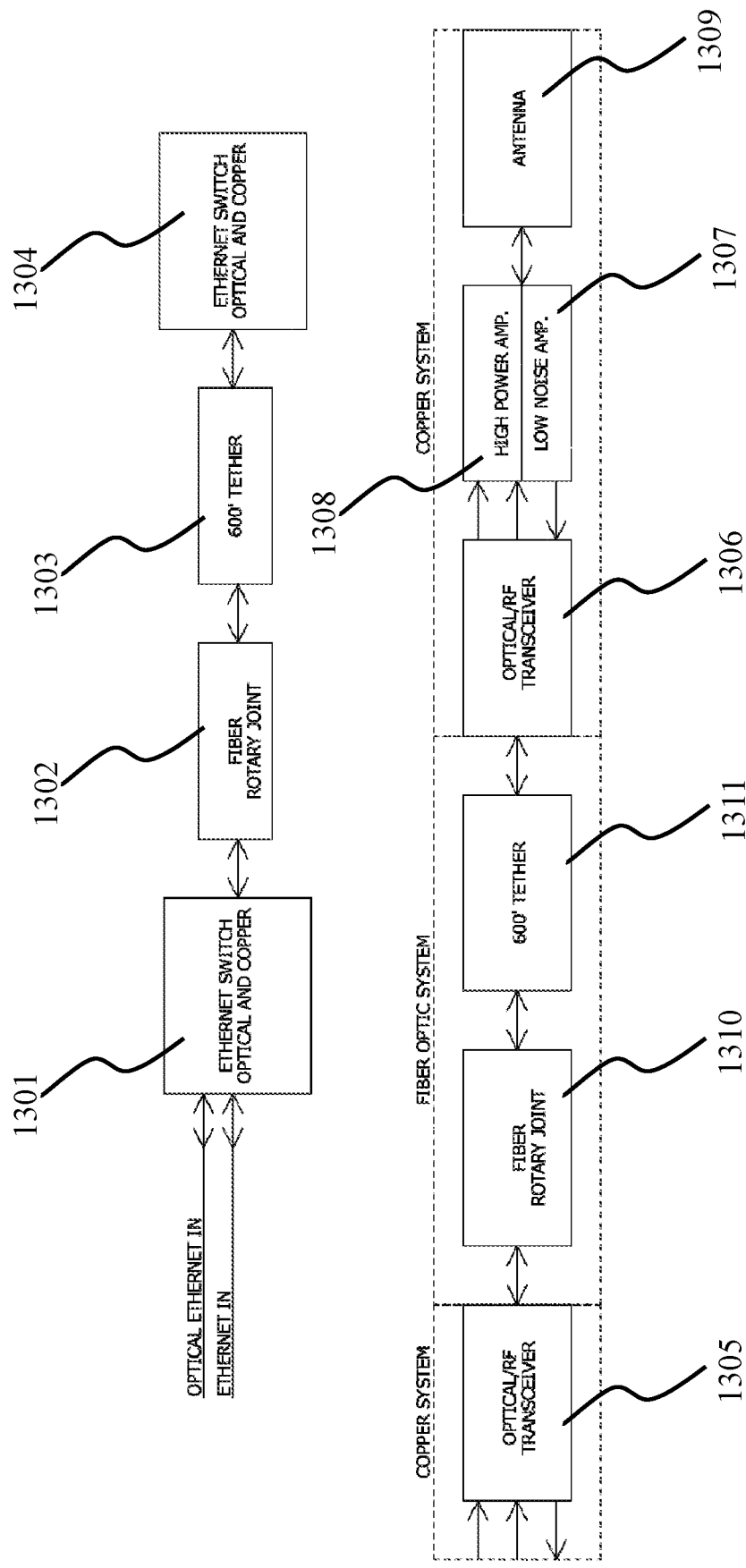
FIG. 13 is a schematic of a system of the present invention.

Systems of the present invention may include one or more novel communication structures to facilitate the relay of radio signals from a UAV. In some embodiments, a system of the present invention includes an RF-over-fiber (RFOF) system for relaying RF signals to the UAV over a tether connecting the UAV to the SSS. One exemplary RFOF system is shown in FIG. 13. The system of FIG. 13 includes a first ethernet switch 1301 connected to ground-based fiber and/or copper ethernet links. In the depicted embodiment, the ethernet switch converts all incoming ethernet traffic to one or more fiber optic connections, which connect to one or more fiber optic cables in the connector 1303 via fiber optic rotary joint 1302. Fibers used with systems of the present invention may be single-mode or multi-mode. In some embodiments, multiple signals may be transmitted on the same fiber using wavelength division multiplexing, i.e. different colors of light are used to carry different signals over the same optical fiber. In other embodiments, time division multiplexing, polarization division multiplexing, or space division multiplexing may be used, alone or in combination. At the other end of the tether, another ethernet switch 1304 converts the received fiber optic data into ethernet data for distribution onboard the aircraft. Although ground-to-air data communication was described, it is understood that the architecture of FIG. 13 may be bidirectional, and may therefore be configured for air-to-ground data communication as well. A view of the radio frequency (RF) architecture includes divisions into copper and fiber optic systems. Optical/RF transceivers 1305 and 1306 at either end of the tether 1311 convert RF signals into light and vice-versa. RF data to be transmitted is passed through a high-power amplifier 1308 to be broadcast by one or more antennas 1309, while received RF data is passed through low-noise amplifier 1307 before being converted back to optical data by transceiver 1306. In this way, the heavy components of the transmitter sit in the ground-based radio, while the lighter RF front-end is positioned on the aircraft. This has the advantage of keeping the expensive radios on the deck of the ship, keeping the radios more secure, increasing bandwidth to the high powered antennas, and reducing the weight of the aircraft.

In one embodiment, a method of takeoff and landing for a UAV tethered to a movable platform is described. Because seafaring vessels often include complex mast structures or vertical protrusions from the deck, a UAV tethered to the vessel may become tangled in the mast, radar, lines, cables, flags, antennas, cameras, or other structures protruding upward from the deck of the seafaring vessel. This risk is increased when the vessel is moving, and so one method of the present invention comprises the step of bringing the vessel bearing the UAV tether to a stop prior to takeoff and landing. Takeoff and landing while stationary increases the probability of success compared to takeoff and landing while moving. In some embodiments, the vessel bearing the UAV tether is slowed to a maximum speed of less than 5 knots. In some embodiments, the vessel is slowed to a maximum speed of less than 1 knots. In some embodiments, the vessel may reorient itself during takeoff or landing to drive with the wind in order to reduce relative airspeed as much as possible. In some embodiments, the UAV tether is actively managed during landing, wherein the tether stops and the aircraft shuts off when the UAV is sufficiently close to the landing platform, even if the UAV is not yet in direct contact with the landing platform.

The present invention also includes various methods of flight control of a UMAR. As is understood in the art, a purely position-based control method typically comprises the steps of comparing a measured position to a destination position, then changing the measured position by moving closer to the destination position. In some position-based control systems, the velocity at which a controlled vehicle moves toward the destination position is proportional to the difference between the measured position and the destination position. That is, when a vehicle is farther from its destination position, it moves faster to cover the distance. A purely position-based control system is easy to implement and works for basic implementations. In some embodiments, the present invention comprises a higher-order method for controlling the UMAR or other vehicle, as would be understood by one skilled in the art. For example, PI control, PID control, or higher order control systems taking into account additional factors when adjusting the attitude and/or velocity of the aircraft. Such higher-order control systems allow for UAVs of the present invention easily to maintain a relative position with respect to the SSS. This in turn reduces the amount of tether out, reduces power consumption, and reduces the likelihood that the tether will snag in any mast equipment or protrusions.

In some embodiments, the controller gathers the position and velocity information from GPS, but other positioning or measurement systems could be used, including but not limited to one or more inertial measurement units (IMUs), optical tracking, or active position determination of aircraft including LIDAR or RADAR. The gathered information may be processed and a new heading determined by a controller located at the base/SSS, or alternatively may be calculated on a controller contained within the UMAR. In some embodiments, a portion of the processing takes place in one controller fixedly attached to the SSS, then the partially processed information communicated up to the UMAR. The UMAR then performs further processing steps on the information before adjusting one or more flight parameters in order to achieve the desired position and heading. In some embodiments, a comparator routine is used to determine the error in actual versus desired direction and heading over time. The comparator routine may then implement an offset to compensate for the error, resulting in tighter vehicle control. In some embodiments, the comparator is a P/PI/PID control algorithm, while in other embodiments the comparator may comprise a Kalman filter or extended Kalman feedback system. Comparators of the present invention may collect telemetry from the ground to be fed to the aircraft to allow the aircraft to follow the ground position closely and efficiently.

Figure 14A:
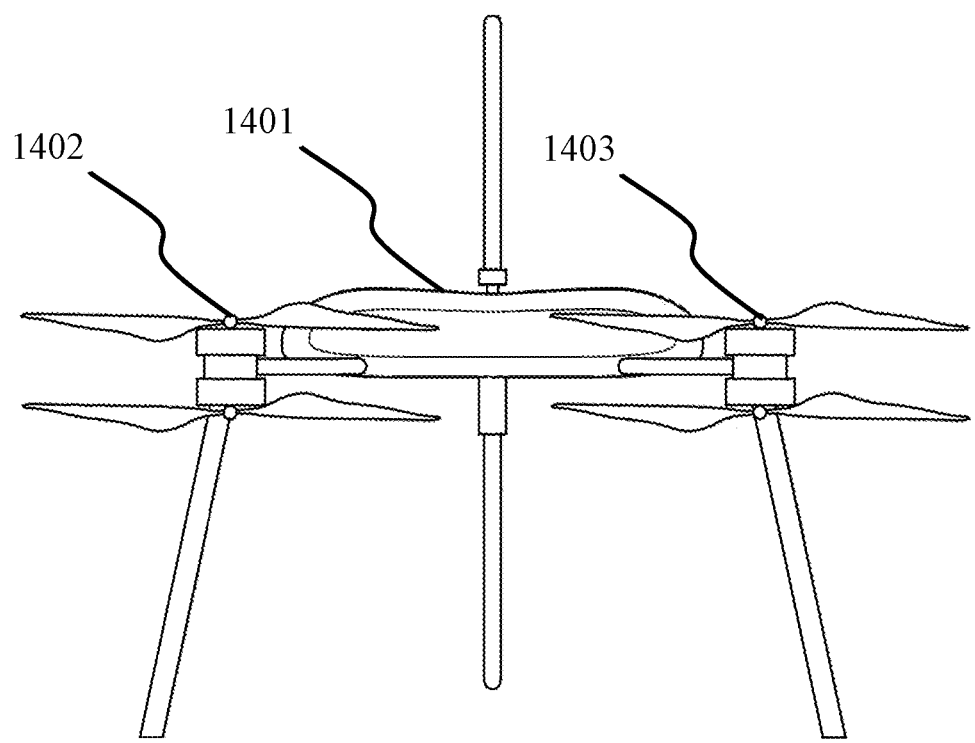
FIG. 14A and FIG. 14B are diagrams of a method of the present invention.
Figure 14B:
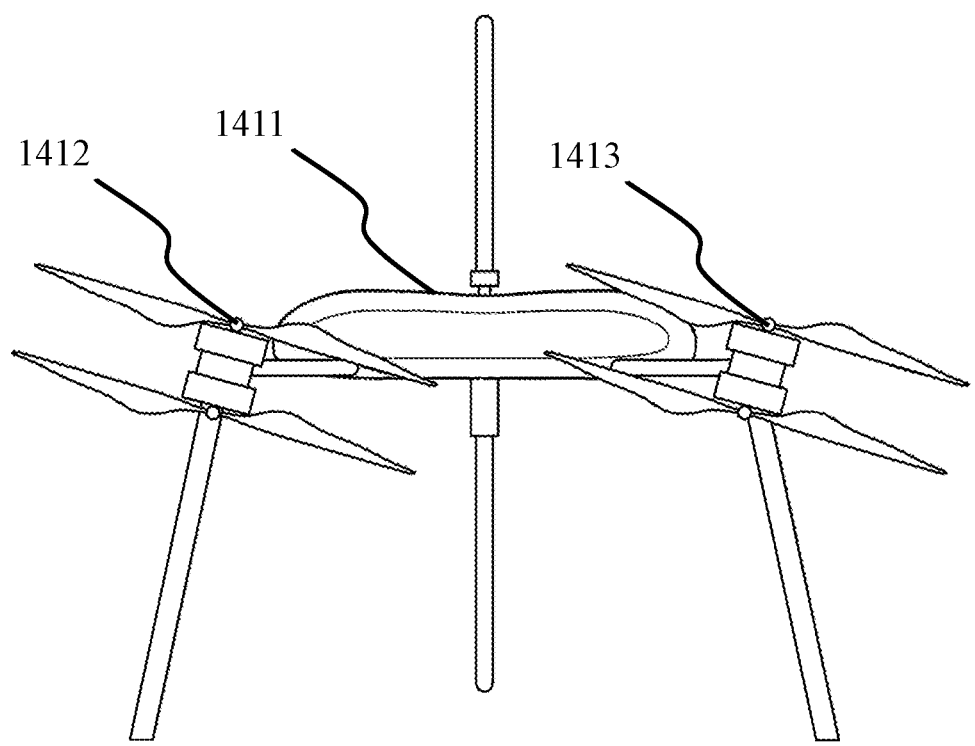

Another aspect of the invention relates to a method of steering and moving a multirotor UAV by tilting the rotors, rather than tilting the entire airframe. Typical multirotor aircraft are naturally un-aerodynamic. In order for a multirotor aircraft to move in any direction, it must change its attitude (pitch or roll) in order to accomplish forward, backward, or lateral motion. Doing so increases its cross-sectional area, and therefore also its drag, reducing efficiency, speed, and power requirements. Increased cross-sectional area also increases the aircraft's radar profile, which can be undesirable. One example of an embodiment of a method of the present invention is shown in FIG. 14A and FIG. 14B. As shown in FIG. 14A, a standard multirotor UAV 1401 has the rotors 1402 and 1403 positioned vertically in order to facilitate vertical takeoff and landing. Once aloft, as shown in FIG. 14B, a multirotor UAV 1411 desiring to move laterally might tilt both rotors 1412 and 1413 to one side, in order to generate thrust with a vertical and a lateral component.

Tiltable rotors of the present invention might be mounted to the airframe via a joint, and actuated by a variety of means, including but not limited to servo motors or some other type of electric motor.

In some embodiments, a tethered multi-rotor aircraft of the present invention may include one or more optical transmission/receiving systems, for example lasers. An aircraft-mounted laser of the present invention may be steerable, and may be of high power, allowing for its use as a directed energy weapon.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed is:

1. An unmanned aerial signal relay, comprising:
   an unmanned aerial vehicle including a communication relay unit and at least one antenna, communicatively connected to the communication relay unit;
   a tether comprising at least two wires and at least one fiber optic cable, the wires and cable communicatively connected to the unmanned aerial vehicle; and
   a surface support system, comprising:
      a spool physically connected to the tether;
      a ground-based receiver communicatively connected to the at least one fiber optic cable; and
      a sheath fluidly connected to a tether inlet and surrounding a first tether pulley, the sheath having a snorkel outlet configured to drain water from the sheath away from the surface support system;
   wherein the unmanned aerial vehicle is powered by electrical energy provided by the at least two wires; and
   wherein the communication relay unit is configured to relay signals received from the at least one antenna via the fiber optic cable to the ground-based receiver.

2. The unmanned aerial signal relay of claim 1, wherein the surface support system further comprises a ground-based transmitter communicatively connected to a second fiber optic cable; and
   wherein the communication relay unit is configured to relay signals received from the ground based transmitter to the at least one antenna.

3. The unmanned aerial signal relay of claim 2, further comprising a plurality of RF-over-fiber transceivers, configured to convert optical signals received from the first fiber optic cable into radio frequency signals for the ground-based receiver, and to convert radio frequency signals from the ground-based transmitter into optical signals for the second fiber optic cable.

4. The unmanned aerial signal relay of claim 1, wherein the tether comprises two wires and two fiber optic cables.

5. The unmanned aerial signal relay of claim 1, wherein the at least one antenna is a directional antenna.

6. The unmanned aerial signal relay of claim 5, wherein the unmanned aerial vehicle is configured to maintain an antenna orientation over time by changing its attitude or altitude.

7. The unmanned aerial signal relay of claim 1, wherein the surface support system further comprises a tether cutter configured to cut the tether if the unmanned aerial vehicle is unrecoverable.

8. The unmanned aerial signal relay of claim 1, wherein the surface support system comprises a fairlead, and the fairlead is configured to allow a minimum bend radius in the tether.

9. The unmanned aerial signal relay of claim 1, wherein the tether further comprises:
   a slip ring connected to the at least two wires, and having a cavity within; and
   a fiber optic rotary joint connected to the at least one optical fiber, the fiber optic rotary joint positioned within the cavity inside the slip ring;
   wherein the slip ring and the fiber optic rotary joint are configured to allow one end of the tether to twist about a primary axis of the tether, while not imparting any twisting force on another end of the tether.

10. The unmanned aerial signal relay of claim 1, further comprising a plurality of linear actuators connected on one end to the landing deck of a surface support system and on the other end to a vehicle, the plurality of linear actuators configured to maintain the attitude of the landing deck when the vehicle moves.

11. The unmanned aerial signal relay of claim 1, further comprising a scissor lift connected on one end to the surface support system and on the other end to a vehicle.

* * * * *